(12) United States Patent
Hinchey et al.

(10) Patent No.: US 7,979,848 B2
(45) Date of Patent: Jul. 12, 2011

(54) SYSTEMS, METHODS AND APPARATUS FOR PATTERN MATCHING IN PROCEDURE DEVELOPMENT AND VERIFICATION

(75) Inventors: Michael G. Hinchey, Bowie, MD (US); James L. Rash, Davidsonville, MD (US); Christopher A. Rouff, Beltsville, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1329 days.

(21) Appl. No.: 11/533,837

(22) Filed: Sep. 21, 2006

(65) Prior Publication Data
US 2007/0067755 A1   Mar. 22, 2007

Related U.S. Application Data

(63) Continuation-in-part of application No. 11/461,669, filed on Aug. 1, 2006, which is a continuation-in-part of application No. 11/203,590, filed on Aug. 12, 2005, now Pat. No. 7,739,671, which is a continuation-in-part of application No. 10/533,376, filed on Apr. 29, 2005, now Pat. No. 7,484,688.

(51) Int. Cl.
 *G06F 9/44* (2006.01)
 *G06F 9/45* (2006.01)
(52) U.S. Cl. ......... 717/127; 717/128; 717/131; 717/141

(58) Field of Classification Search ........................ None
See application file for complete search history.

(56) References Cited

U.S. PATENT DOCUMENTS 5,247,651 A * 9/1993 Clarisse .......................... 703/13
6,898,791 B1 * 5/2005 Chandy et al. ................ 719/314

* cited by examiner

*Primary Examiner* — Chuck O Kendall
(74) *Attorney, Agent, or Firm* — Heather Goo

(57) ABSTRACT

Systems, methods and apparatus are provided through which, in some embodiments, a formal specification is pattern-matched from scenarios, the formal specification is analyzed, and flaws in the formal specification are corrected. The systems, methods and apparatus may include pattern-matching an equivalent formal model from an informal specification. Such a model can be analyzed for contradictions, conflicts, use of resources before the resources are available, competition for resources, and so forth. From such a formal model, an implementation can be automatically generated in a variety of notations. The approach can improve the resulting implementation, which, in some embodiments, is provably equivalent to the procedures described at the outset, which in turn can improve confidence that the system reflects the requirements, and in turn reduces system development time and reduces the amount of testing required of a new system. Moreover, in some embodiments, two or more implementations can be "reversed" to appropriate formal models, the models can be combined, and the resulting combination checked for conflicts. Then, the combined, error-free model can be used to generate a new (single) implementation that combines the functionality of the original separate implementations, and may be more likely to be correct.

27 Claims, 25 Drawing Sheets

SYSTEMS, METHODS AND APPARATUS FOR PATTERN MATCHING IN PROCEDURE DEVELOPMENT AND VERIFICATION

RELATED APPLICATIONS

This application is a continuation-in-part of co-pending U.S. application Ser. No. 11/461,669 filed on Aug. 1, 2006 entitled "Systems, Methods and Apparatus for Procedure Development and Verification," which is a continuation-in-part of U.S. application Ser. No. 11/203,590 filed Aug. 12, 2005 now U.S. Pat. No. 7,739,671 entitled "Systems, Methods & Apparatus For Implementation Of Formal Specifications Derived From Informal Requirements," which is a continuation-in-part of U.S. application Ser. No. 10/533,376 filed Apr. 29, 2005 now U.S. Pat. No. 7,484,688 entitled "System and Method for Deriving a Process-based Specification."

ORIGIN OF THE INVENTION

The invention described herein was made by employees of the United States Government and may be manufactured and used by or for the Government of the United States of America for governmental purposes without the payment of any royalties thereon or therefor.

FIELD OF THE INVENTION

This invention relates generally to software development processes and more particularly to validating a system implemented from requirements expressed in natural language or a variety of graphical notations.

BACKGROUND OF THE INVENTION

High dependability and reliability is a goal of all computer and software systems. Complex systems in general cannot attain high dependability without addressing crucial remaining open issues of software dependability. The need for ultra-high dependable systems increases continually, along with a corresponding increasing need to ensure correctness in system development. Correctness exists where the implemented system is equivalent to the requirements, and where this equivalence can be mathematically proven.

The development of a system may begin with the development of a requirements specification, such as a formal specification or an informal specification. A formal specification might be encoded in a high-level language, whereas requirements in the form of an informal specification can be expressed in restricted natural language, "if-then" rules, graphical notations, English language, programming language representations, flowcharts, scenarios or even using semi-formal notations such as unified modeling language (UML) use cases.

A scenario can be defined as a natural language text (or a combination of any, e.g. graphical, representations of sequential steps or events) that describes the software's actions in response to incoming data and the internal goals of the software. Some scenarios can also describe communication protocols between systems and between the components within the systems. Also, some scenarios can be known as UML use-cases. In some embodiments, a scenario describes one or more potential executions of a system, describing what happens in a particular situation, and what range of behaviors is expected from or omitted by the system under various conditions.

Natural language scenarios are usually constructed in terms of individual scenarios written in a structured natural language. Different scenarios can be written by different stakeholders of the system, corresponding to the different views the stakeholders have of how the system will perform, including alternative views corresponding to higher or lower levels of abstraction. Natural language scenarios can be generated by a user with or without mechanical or computer aid. The set of natural language scenarios provides the descriptions of actions that occur as the software executes. Some of these actions may be explicit and required, while others can be due to errors arising, or as a result of adapting to changing conditions as the system executes.

For example, if the system involves commanding space satellites, scenarios for that system can include sending commands to the satellites and processing data received in response to the commands. Natural language scenarios might be specific to the technology or application domain to which the natural language scenarios are applied. A fully automated general purpose approach covering all domains is technically prohibitive to implement in a way that is both complete and consistent. To ensure consistency, the domain of application might be purpose-specific. For example, scenarios for satellite systems might not be applicable as scenarios for systems that manufacture agricultural chemicals.

After completion of an informal specification that represents domain knowledge, the system is developed. A formal specification is not necessarily used by the developer in the development of a system.

In the development of some systems, computer readable code is generated. The generated code is typically encoded in a computer language, such as a high-level computer language. Examples of such languages include Java, C, C Language Integrated Production System (CLIPS), and Prolog.

One step in creating a system with high dependability and reliability can be verification and validation that the executable system accurately reflects the requirements. Validation of the generated code is sometimes performed through the use of a domain simulator, a very elaborate and costly approach that is computationally intensive. This process of validation via simulation rarely results in an unambiguous result and rarely results in uncontested results among systems analysts. In some examples, a system is validated through parallel mode, shadow mode operations with a human operated system. This approach can be very expensive and exhibit severely limited effectiveness. In some complex systems, this approach leaves vast parts of possible execution paths forever unexplored and unverified.

During the life cycle of a system, requirements typically evolve. Manual change to the system creates a risk of introducing new errors and necessitates retesting and revalidation, which can greatly increase the cost of the system. Often, needed changes are not made due to the cost of verifying/validating consequential changes in the rest of the system. Sometimes, changes are simply made in the code and not reflected in the specification or design, due to the cost or due to the fact that those who generated the original specification or design are no longer available.

For the reasons stated above, and for other reasons stated below which will become apparent to those skilled in the art upon reading and understanding the present specification, there is a need in the art to reduce system development time, reduce the amount of testing required of a new system, and improve confidence that the system reflects the requirements.

BRIEF DESCRIPTION OF THE INVENTION

The above-mentioned shortcomings, disadvantages and problems are addressed herein, which will be understood by reading and studying the following discussion.

Some embodiments of the systems, methods and apparatus described herein provide automated analysis, validation, verification, and generation of complex procedures. The generation is performed by pattern matching with set comprehensions without a theorem-prover or a formal proof of correctness. The systems, methods and apparatus may include pattern-matching an equivalent formal model from an informal specification. Such a model can be analyzed for contradictions, conflicts, use of resources before the resources are available, competition for resources, and so forth. From such a formal model, an implementation can be automatically generated in a variety of notations. Some implementations may include traditional programming language code, machine language code, scripts, and/or procedures. The approach can improve the resulting implementation, which, in some embodiments, is provably equivalent to the procedures described at the outset, which in turn can improve confidence that the system reflects the requirements, and in turn reduces system development time and reduces the amount of testing required of a new system. Moreover, in some embodiments, two or more implementations can be "reversed" to appropriate formal models, the models can be combined, and the resulting combination checked for conflicts. Then, the combined, error-free model can be used to generate a new (single) implementation that combines the functionality of the original separate implementations, and may be more likely to be correct.

In at least one embodiment, systems, methods and apparatus are provided through which scenarios are pattern-matched without human intervention into a formal specification or other process-based specification segment. In some embodiments, the formal specification is converted to an implementation. In some embodiments, the formal specification is analyzed for errors, which reduces errors in the formal specification. In some embodiments, the formal specification is translated back to an informal specification expressed in natural language or a plurality of graphical notations. The scenario or complex set of procedures can be designed for the assembly and maintenance of devices (whether by human or robots), for business operation, or for experimentation in a laboratory (such as might be used by the bioinformatics community).

In other embodiments, a system may include an inference engine and a pattern matcher, the pattern matcher being operable to receive scenarios and to generate, in reference to an inference engine, a formal specification. The system may also include an analyzer operable to perform model verification/checking and determine existence of omissions, deadlock, livelock, and race conditions or other problems and inconsistencies in either the formal specification or the scenario.

In yet other embodiments, a method may include pattern-matching requirements expressed informally in natural language or a plurality of graphical notations to a formal specification or scenario, and analyzing the formal specification or scenario.

Systems, clients, servers, methods, and computer-readable media of varying scope are described herein. In addition to the embodiments and advantages described in this summary, further embodiments and advantages will become apparent by reference to the drawings and by reading the detailed description that follows.

DETAILED DESCRIPTION OF THE INVENTION

In the following detailed description, reference is made to the accompanying drawings that form a part hereof, and in which is shown, by way of illustration, specific embodiments which can be practiced. These embodiments are described in sufficient detail to enable those skilled in the art to practice the embodiments, and it is to be understood that other embodiments can be utilized and that logical, mechanical, electrical and other changes can be made without departing from the scope of the embodiments. The following detailed description is, therefore, not to be taken in a limiting sense.

The detailed description is divided into six sections. In the first section, embodiments of a system level overview are described. In the second section, embodiments of methods are described. In the third section, embodiments of the hardware and the operating environment, in conjunction with which embodiments can be practiced, is described. In the fourth section, particular CSP implementations of embodiments are described. In the fifth section, particular apparatus embodiments are described. Finally, in the sixth section, a conclusion of the detailed description is provided.

System Level Overview

Figure 1:
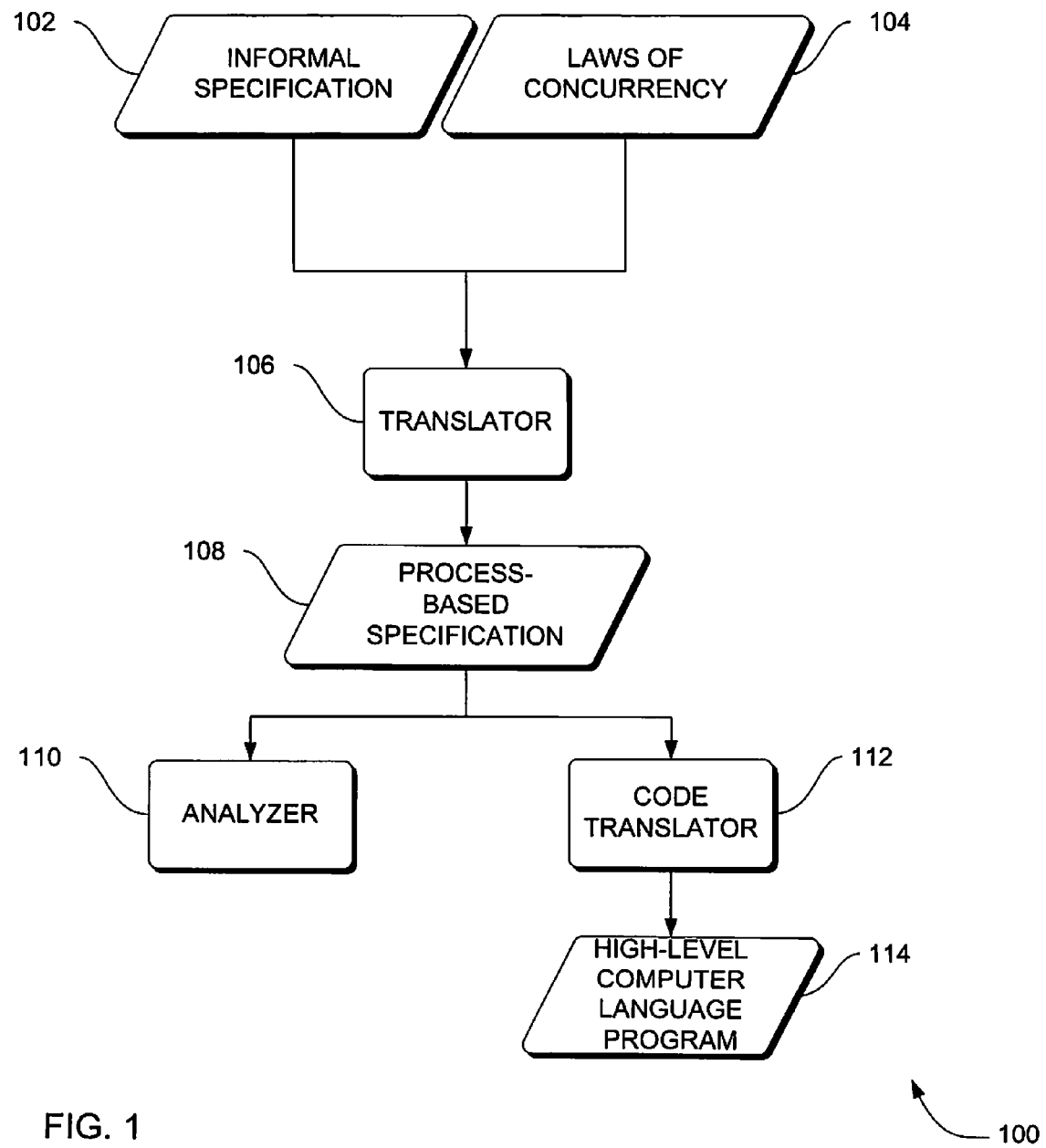
FIG. 1 is a block diagram that provides an overview of a system to generate a high-level computer source code program from an informal specification, according to an embodiment of the invention.
Figure 2:
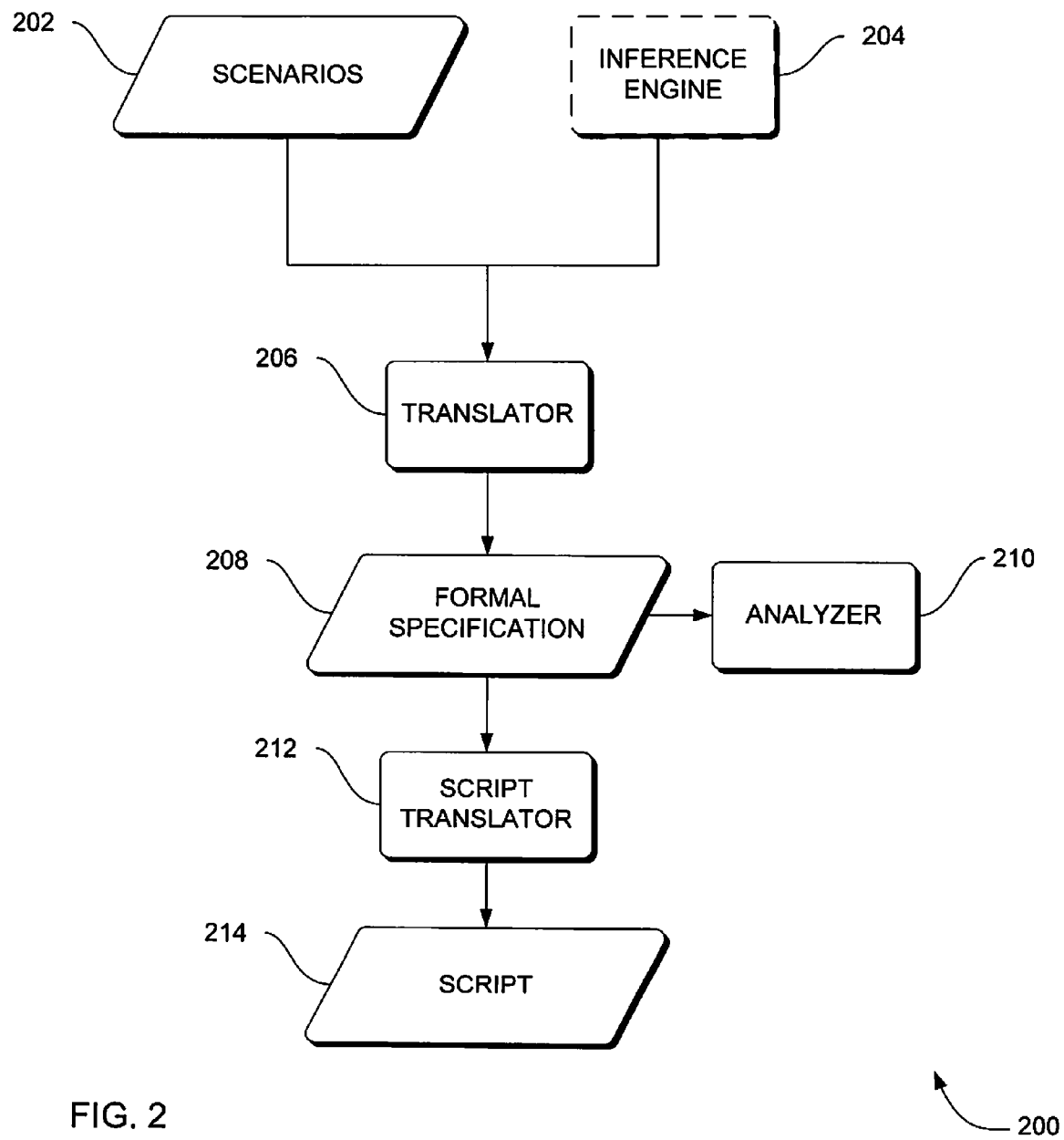
FIG. 2 is a block diagram that provides an overview of a system to engineer a script or procedure from scenarios, according to an embodiment of the invention.
Figure 3:
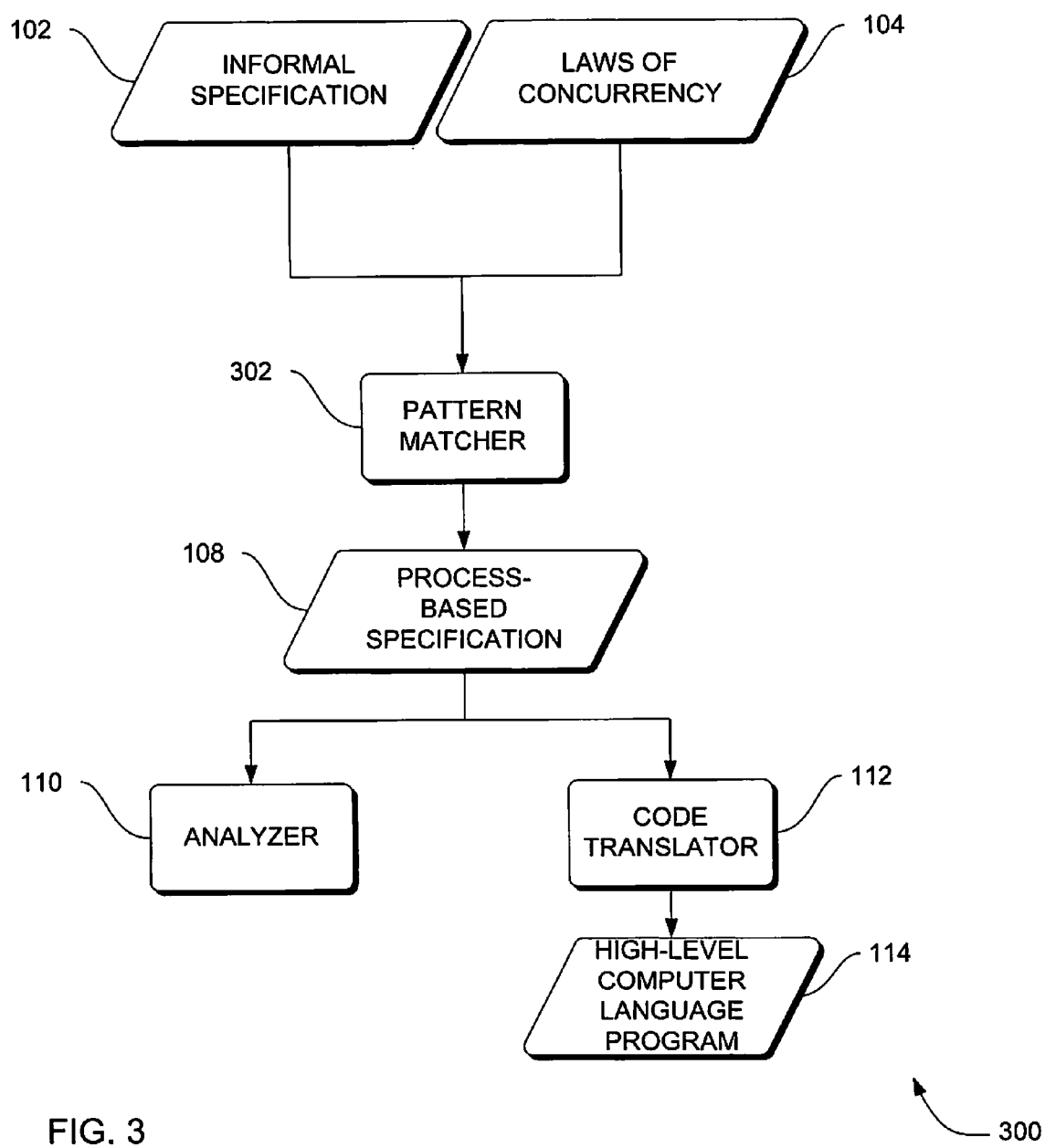
FIG. 3 is a block diagram that provides an overview of a system to generate a high-level computer source code program from an informal specification, according to an embodiment that includes a pattern matcher.
Figure 4:
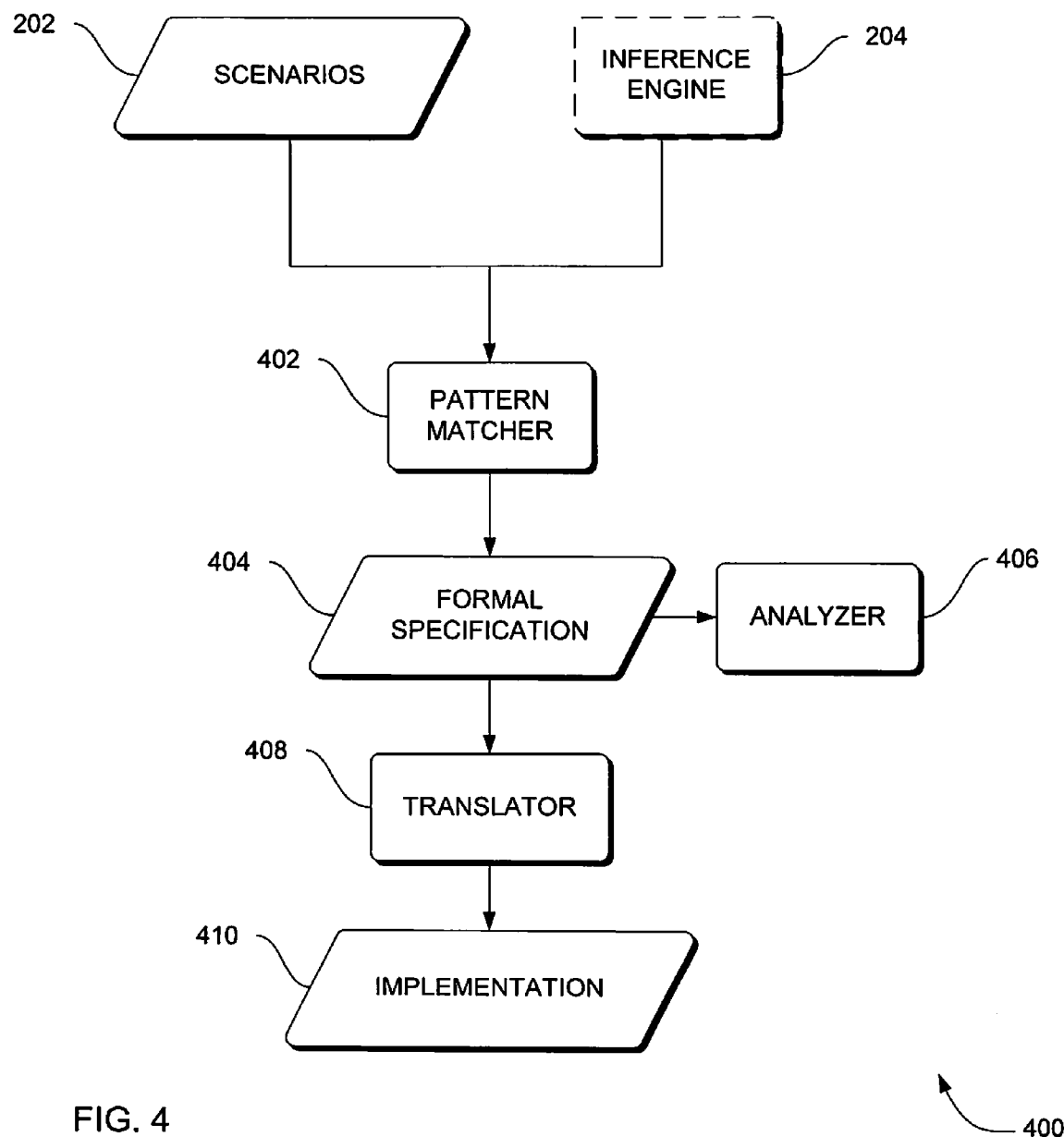
FIG. 4 is a block diagram that provides an overview of a system to engineer an implementation from scenarios, according to an embodiment that may include a pattern matcher and an inference engine.

FIG. 1 is a block diagram that provides an overview of a system 100 to generate a high-level computer source code program from an informal specification, according to an embodiment. FIG. 2 is a block diagram that provides an overview of a system 200 to generate a formal specification and an implementation from descriptions of a system, according to embodiments. FIG. 3 is a block diagram that provides an overview of a system to generate a high-level computer source code program from an informal specification, according to an embodiment that includes a pattern matcher. FIG. 4 is a block diagram that provides an overview of a system to generate a formal specification and an implementation from descriptions of a system, according to an embodiment that includes a pattern matcher and an inference engine.

System 100 may solve the need in the art for an automated, generally applicable way to produce a system that can be a provably correct implementation of an informal design specification that does not require, in applying the system to any particular problem or application, the use of a theorem-prover.

System 100 may be a software development system that includes a data flow and processing points for the data. System 100 may be representative of (i) computer applications and electrical engineering applications such as chip design and other electrical circuit design, (ii) business management applications in areas such as workflow analysis, (iii) artificial intelligence applications in areas such as knowledge-based systems and agent-based systems, (iv) highly parallel and highly-distributed applications involving computer command and control and computer-based monitoring, and (v) any other area involving process, sequence or algorithm design. According to the disclosed embodiments, system 100 may mechanically convert different types of specifications (either natural language scenarios or descriptions which are effectively pre-processed scenarios) into process-based formal specifications on which model checking and other mathematics-based verifications can be performed, and then optionally can convert the formal specification into code.

System 100 may include an informal specification 102 having a plurality of rules or requirements. The informal specification can be expressed in restricted natural language, graphical notations, English language, programming language representations, scenarios or even using semi-formal notations such as unified modeling language (UML) use cases. One skilled in the art will recognize that other languages and graphic indicators may exist that fall within the scope of this invention.

A scenario may be natural language text (or a combination of any (possibly graphical) representations of sequential steps or events) that describes the software's actions in response to incoming data and the internal goals of the software. Scenarios also may describe communication protocols between systems and between the components within the systems. Scenarios also may be known as use cases. A scenario can describe one or more potential executions of a system, describing what happens in a particular situation, and what range of behaviors is expected from or omitted by the system under various conditions.

System 100 may also include a set of laws of concurrency 104. Laws of concurrency 104 can be rules detailing equivalences between sets of processes combined in various ways, and/or relating process-based descriptions of systems or system components to equivalent sets of traces. An example of the laws of concurrency 104 is given in "Concurrent Systems: Formal Development in CS by M. G. Hinchey an S. A. Jarvis, McGraw-Hill International Series in Software Engineering, New York and London, 1995, which is herein incorporated by reference in its entirety. Laws of concurrency 104 may be expressed in any suitable language for describing concurrency. These languages may include, but are not limited to, CSP (Communicating Sequential Processes), CCS (Calculus of Communicating Systems) and variants of these languages.

The informal specification 102 and a set of laws of concurrency 104 can be received by a translator 106, which may be a mechanical translator. The plurality of rules or requirements of the informal specification 102 may be translated mechanically to a process-based specification 108 or other formal specification language representation. The mechanical aspect can mean that no manual intervention in the translation is provided. In some embodiments, the process-based specification 108 is an intermediate notation or language of sequential process algebra such as Hoare's language of Communicating Sequential Processes (CSP).

The process-based specification 108 may be mathematically and provably equivalent to the informal specification 102. Mathematically equivalent does not necessarily mean mathematically equal. Mathematical equivalence of A and B means that A implies B and B implies A. Note that applying the laws of concurrency 104 to the process-based specification 108 would allow for the retrieval of a trace-based specification that may be equivalent to the informal specification 102. Note that the process-based specification may be mathematically equivalent to rather than necessarily equal to the original informal specification 108. This indicates that the process may be reversed, allowing for reverse engineering of existing systems, or for iterative development of more complex systems.

In some embodiments, the system includes an analyzer 110 to determine various properties such as existence of omissions, deadlock, livelock, and race conditions in the process-based specification 108.

System 100 may also include a code translator 112 to translate the plurality of process-based specification segments 108 to a set of instructions in a high-level computer language program 114, such as the Java language.

System 100 may be operational for a wide variety of informal specification languages and applications, thus system 100 can be generally applicable. Such applications will be apparent to one skilled in the art and may include distributed software systems, sensor networks, robot operation, complex scripts for spacecraft integration and testing, chemical plant operation and control, and autonomous systems.

System 100 can provide mechanical regeneration of the executable system when requirements dictate a change in the high level specification. In system 100, all that may be required to update the generated application may be a change in the informal specification 102, and then the changes and validation can ripple through in a mechanical process when system 100 operates. This also can allow the possibility of cost effectively developing competing designs for a product and implementing each to determine the best one.

In some embodiments, system 100 does not include a theorem-prover to infer the process-based specification segments from the informal specification. However, the plurality of process-based specification segments 108 may be provably correct implementations of the informal specification 102, provided the developer of an instance of system 100 has properly used a theorem-prover (not shown) to prove that the translator 106 correctly translates informal specifications into formal specifications.

Figure 17:
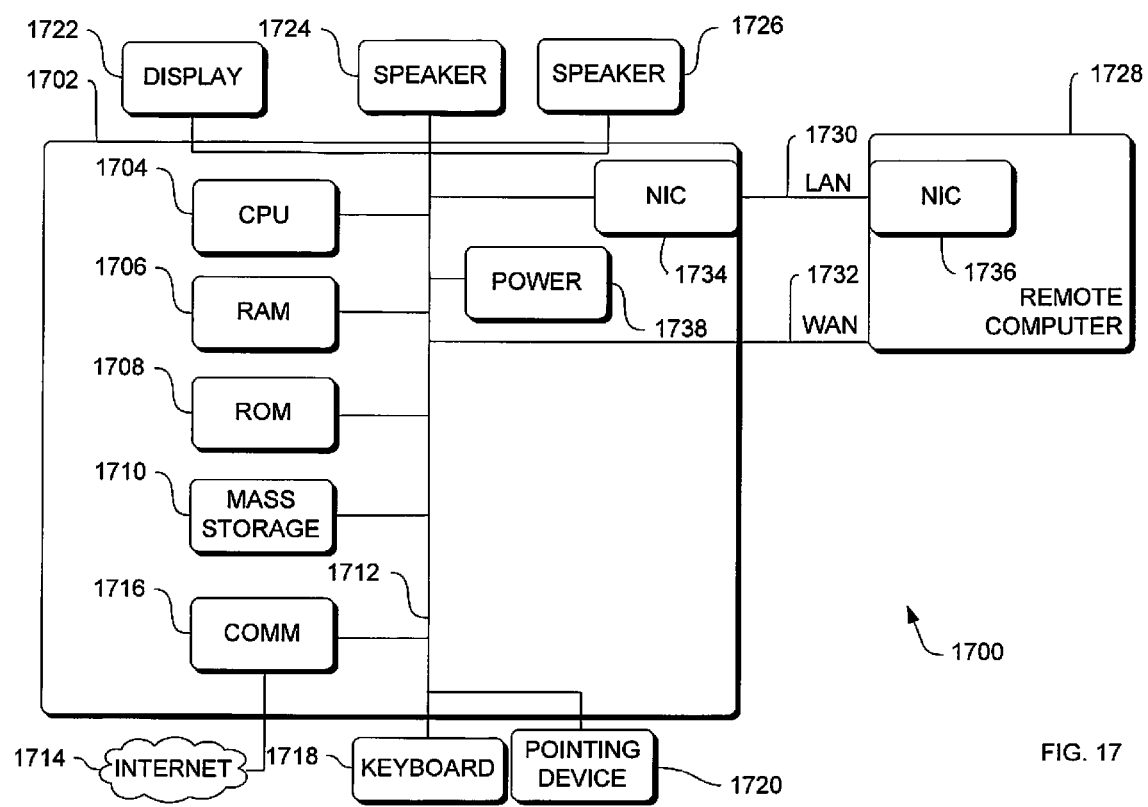
FIG. 17 is a block diagram of the hardware and operating environment in which different embodiments can be practiced, according to an embodiment.

Some embodiments of system 100 operate in a multi-processing, multi-threaded operating environment on a computer, such as computer 1702 in FIG. 17. While the system 100 is not limited to any particular informal specification 102, plurality of rules or requirements, set of laws of concurrency 104, translator 106, process-based specification 108, analyzer 110, code translator 112 and high-level computer language program 114, for sake of clarity a simplified informal specification 102, plurality of rules or requirements, set of laws of concurrency 104, translator 106, process-based specification 108, analyzer 110, code translator 112, and high-level computer language program 114 are illustrated.

System 100 may relate to the field of chemical or biological process design or mechanical system design, and, generally to any field where the behaviors exhibited by a process to be designed can be described by a set of scenarios expressed in natural language, or some appropriate graphical notation or textual notation.

FIG. 2 is a block diagram that provides an overview of a system 200 to engineer a script or procedure from scenarios, according to an embodiment. System 200 may solve the need in the art for an automated, generally applicable way to verify that an implemented script is a provably correct implementation of a set of scenarios.

One embodiment of the system 200 may be a software development system that includes a data flow and processing points for the data. According to some embodiments, system 200 can convert scenarios into a script on which model checking and other mathematics-based verifications can then be performed.

The system 200 can include a plurality of scenarios 202. The scenarios 202 can be written in a particular syntax, such as constrained natural language or graphical representations. The scenarios 202 can embody software applications, although one skilled in the art will recognize that other systems fall within the purview of this invention.

In at least one embodiment, the scenarios 202 may be received by a translator 206. In some embodiments, the optional inference engine 204 might be referenced by the translator 206 when the scenarios 202 are translated by the translator 206 into a formal specification 208. Subsequently, the formal specification 208 can be translated by script translator 212 into a script 214 in some appropriate scripting language. In some embodiments, no manual intervention in the translation is provided. Those skilled in the art will readily understand that other appropriate notations and/or languages exist that are within the scope of this invention.

In some embodiments, system 200 can include an analyzer 210 to determine various properties of the formal specification, such as the existence of omissions, deadlock, livelock, and race conditions, as well as other conditions, in the formal specification 208, although one skilled in the art will recognize that other additional properties can be determined by the analyzer 210. The analyzer 210 may solve the need in the prior art to reduce errors.

The terms "scripts" and "procedures" can be used interchangeably. Scripts can encompass not only instructions written in programming languages (such as Python, awk, etc., as described) but also languages for physical (electro-mechanical) devices and even in constrained natural language instructions or steps or checklists to be carried out by human beings such as, but not limited to, an astronaut.

Scripting languages are computer programming languages initially used only for simple, repeated actions. The name "scripting languages" comes from a written script such as a screenplay, where dialog is repeated verbatim for every performance. Early script languages were often called batch languages or job control languages. A script is typically interpreted rather than compiled, but not always. Scripting languages may also be known as scripting programming languages or script languages.

Many such languages can be quite sophisticated and have been used to write elaborate programs, which are often still called scripts even though the applications of scripts are well beyond automating simple computer tasks. A script language can be found at almost every level of a computer system. Besides being found at the level of the operating system, scripting languages appear in computer games, web applications, word processing documents, network software and more. Scripting languages favor rapid development over efficiency of execution; scripting languages are often implemented with interpreters rather than compilers; and scripting languages are effective in communication with program components written in other languages.

Many scripting languages emerged as tools for executing one-off tasks, particularly in system administration. One way of looking at scripts is as "glue" that puts several components together; thus scripts are widely used for creating graphical user interfaces or executing a series of commands that might otherwise have to be entered interactively through keyboard at the command prompt. The operating system usually offers some type of scripting language by default, widely known as a shell script language.

Scripts are typically stored only in their plain text form (as ASCII) and interpreted, or compiled, each time prior to being invoked.

Some scripting languages are designed for a specific domain, but often it is possible to write more general programs in that language. In many large-scale projects, a scripting language and a lower level programming language are used together, each lending its particular strengths to solve specific problems. Scripting languages are often designed for interactive use, having many commands that can execute individually, and often have very high level operations (for example, in the classic UNIX shell (sh), most operations are programs).

Such high level commands simplify the process of writing code. Programming features such as automatic memory management and bounds checking can be taken for granted. In a 'lower level' or non-scripting language, managing memory and variables and creating data structures tend to consume more programmer effort and lines of code to complete a given task. In some situations this is well worth it for the resulting fine-grained control. The scripter typically has less flexibility to optimize a program for speed or to conserve memory.

For the reasons noted above, it is usually faster to program in a scripting language, and script files are typically much smaller than programs with equivalent functionality in conventional programming languages such as C.

Scripting languages may fall into eight primary categories: Job control languages and shells, macro languages, application-specific languages, web programming languages, text processing languages, general-purpose dynamic languages, extension/embeddable languages, and extension/embeddable languages.

In regards to job control scripting languages and shells, a major class of scripting languages has grown out of the automation of job control—starting and controlling the behavior of system programs. Many of these languages' interpreters double as command-line interfaces, such as the Unix shell or the MS-DOS COMMAND.COM. Others, such as AppleScript, add scripting capability to computing environments lacking a command-line interface. Examples of job control scripting languages and shells include AppleScript, ARexx (Amiga Rexx), bash, csh, DCL, 4NT, JCL, ksh, MS-DOS batch, Windows PowerShell, REXX, sh, and Winbatch In regards to macro scripting languages, with the advent of Graphical user interfaces, a specialized kind of scripting language for controlling a computer evolved. These languages, usually called Macro languages, interact with the same graphic windows, menus, buttons and such that a person does. Macro language scripts are typically used to automate repetitive actions or configure a standard state. Macro language scripts can be used to control any application running on a GUI-based computer, but in practice the support for such languages depends on the application and operating system. Examples of macro scripting languages include AutoHotkey, AutoIt, and Expect.

In regards to application-specific scripting languages, many large application programs include an idiomatic scripting language tailored to the needs of the application user.

Likewise, many computer game systems use a custom scripting language to express the programmed actions of non-player characters and the game environment. Languages of this sort are designed for a single application and, while application-specific scripting languages can superficially resemble a specific general-purpose language (e.g. QuakeC, modeled after C), application-specific scripting languages have custom features which distinguish such languages. Examples of application-specific scripting languages include, Action Code Script, ActionScript, AutoLISP, BlobbieScript [1], Emacs Lisp, HyperTalk, IRC script, Lingo, Cana Embedded Language, mIRC script, NWscript, QuakeC, UnrealScript, Visual Basic for Applications, VBScript, and ZZT-oop.

In regards to web programming scripting languages, an important type of application-specific scripting language is one used to provide custom functionality to internet web pages. Web programming scripting languages are specialized for internet communication and use web browsers for their user interface. However, most modern web programming scripting languages are powerful enough for general-purpose programming. Examples of web programming scripting language include ColdFusion (Application Server), Lasso, Miva, and SMX.

In regards to text processing scripting languages, the processing of text-based records is one of the oldest uses of scripting languages. Many text processing languages, such as Unix's awk and, later, PERL, were originally designed to aid system administrators in automating tasks that involved Unix text-based configuration and log files. PERL is a special case—originally intended as a report-generation language, it has grown into a full-fledged applications language in its own right. Examples of text processing scripting languages include awk, PERL, sed and XSLT.

In regards to general-purpose dynamic scripting languages, some languages, such as PERL, began as scripting languages but developed into programming languages suitable for broader purposes. Other similar languages—frequently interpreted, memory-managed, dynamic—have been described as "scripting languages" for these similarities, even if general-purpose dynamic scripting languages are more commonly used for applications programming. Examples of general-purpose dynamic scripting languages include APL, Dylan, Groovy, MUMPS (M), newLISP, PERL, PHP, Python, Ruby, Scheme, Smalltalk, SuperCard, and Tool command language (TCL). TCL was created as an extension language but has come to be used more frequently as a general purpose language in roles similar to Python, PERL, and Ruby.

In regards to extension/embeddable languages, a small number of languages have been designed for the purpose of replacing application-specific scripting languages, by being embeddable in application programs. The application programmer (working in C or another systems language) includes "hooks" where the scripting language can control the application. These languages serve the same purpose as application-specific extension languages, but with the advantage of allowing some transfer of skills from application to application. Examples of extension/embeddable script languages include Ch (C/C++ interpreter), ECMAScript a.k.a. DMDScript, JavaScript, JScript, GameMonkeyScript, Guile, ICI, Squirrel, Lua, TCT, and REALbasic Script (RBScript).

JavaScript began as and primarily still is a language for scripting inside of web browsers, however, the standardization of the language as ECMAScript has made JavaScript widely adopted as a general purpose embeddable language.

Other scripting languages include BeanShell (scripting for Java), CobolScript, Escapade (server side scripting), Euphoria, F-Script, Ferite, Groovy, Gui4Cli, To, KiXtart, Mondrian, Object REXX, Pike, Pliant, REBOL, ScriptBasic, Shorthand Language, Simkin, Sleep, StepTalk, and Visual DialogScript.

In some embodiments, the script 214 can be mathematically and provably equivalent to the scenarios 202. Mathematically equivalent does not necessarily mean mathematically equal. Mathematical equivalence of A and B means that A implies B and B implies A. Note that the script 214 of some embodiments can be mathematically equivalent to, rather than necessarily equal to, the scenarios 202.

In some embodiments, the formal specification 208 can be a process-based specification, such as process algebra encoded notation. The process algebra encoded notation is a mathematically notated form. This embodiment may satisfy the need in the art for an automated, mathematics-based process for requirements validation that does not require large computational facilities.

In some embodiments, the scenarios 202 of system 200 can specify allowed situations, events and/or results of a software system. In that sense, the scenarios 202 can provide a very abstract specification of the software system.

Some embodiments of system 200 can be operational for a wide variety of rules, computer instructions, computer languages and applications; thus, system 200 may be generally applicable. Such applications can include, without limitation, space satellite control systems, distributed software systems, sensor networks, robot operations, complex scripts for spacecraft integration and testing, chemical plant operation and control, autonomous systems, electrical engineering applications such as chip design and other electrical circuit design, business management applications in areas such as workflow analysis, artificial intelligence applications in areas such as knowledge-based systems and agent-based systems, highly parallel and highly-distributed applications involving computer command and control and computer-based monitoring, and any other area involving process, sequence or algorithm design. Hence, one skilled in the art will recognize that any number of other applications not listed can fall within the scope of this invention.

Some embodiments of the system 200 can provide mechanical or automatic generation of the script 214, in which human intervention is not required. In at least one embodiment of the system 200, all that may be required to update the generated application is a change in the scenarios 202, in which case the changes and validation can ripple through the entire system without human intervention when system 200 operates. This also allows the possibility of cost effectively developing competing designs for a product and implementing each to determine the best one.

Some embodiments of the system 200 may not include an automated logic engine, such as a theorem-prover or an automated deduction engine, to infer the script 214 from the scenarios 202. However, the script 214 can be a provably correct version of the scenarios 202.

Thus, in regards to scripts and complex procedures, automatic code generation of system 200 can generate procedures/scripts in suitable scripting language or device control language (such as for a robot) that would provide the procedures, once validated, to be automatically transformed into an implementation. Additionally, system 200 can be used to "reverse engineer" existing procedures/scripts so that the existing procedures/scripts can be analyzed and corrected and recast in a format and form that can be more easily understood. System 200 also can be used to reverse engineer multiple existing procedures/scripts (even written in different languages) to a single formal model by which the procedures/scripts are combined, analyzed for conflicts, and regenerated as a single procedure/script (in the same or a different procedure/scripting language).

Some embodiments of system 200 may operate in a multiprocessing, multi-threaded operating environment on a computer, such as the computer 1702 illustrated in FIG. 17. While the system 200 is not limited to any particular scenarios 202, inference engine 204, translator 206, formal specification 208, analyzer 210, script translator 212 and script 214, for sake of clarity, embodiments of simplified scenarios 202, inference engine 204, translator 206, formal specification 208, analyzer 210, script translator 212 and script 214 are described.

In some embodiments, the system 200 may be a software development system that can include a data flow and processing points for the data. System 200 can be representative of (i) computer applications and electrical engineering applications such as chip design and other electrical circuit design, (ii) business management applications in areas such as workflow analysis, (iii) artificial intelligence applications in areas such as knowledge-based systems and agent-based systems, (iv) highly parallel and highly-distributed applications involving computer command and control and computer-based monitoring, and (v) any other area involving process, sequence or algorithm design. One skilled in the art, however, will recognize that other applications can exist that are within the purview of this invention. According to the disclosed embodiments, system 200 can, without human intervention, convert different types of specifications (such as natural language scenarios or descriptions which are effectively preprocessed scenarios) into process-based scripts on which model checking and other mathematics-based verifications are performed, and then optionally convert the script into code.

System 200 can be operational for a wide variety of languages for expressing requirements, thus system 200 may be generally applicable. Such applications may include, without limitation, distributed software systems, sensor networks, robot operation, complex scripts for spacecraft integration and testing, chemical plant operation and control, and autonomous systems. One skilled in the art will understand that these applications are cited by way of example and that other applications can fall within the scope of the invention.

According to some embodiments, a scenario can be a natural language text (or a combination of any, such as possibly graphical, representations of sequential steps or events) that describes the software's actions in response to incoming data and the internal goals of the software. Scenarios also can describe communication protocols between systems and between the components within the systems. Scenarios also can be known as use cases. A scenario can describe one or more potential executions of a system, such as describing what happens in a particular situation and what range of behaviors is expected from or omitted by the system under various conditions.

Natural language scenarios can be constructed in terms of individual scenarios written in a structured natural language. Different scenarios can be written by different stakeholders of the system, corresponding to the different views the stakeholders can have of how the system will perform, including alternative views corresponding to higher or lower levels of abstraction. Natural language scenarios can be generated by a user with or without mechanical or computer aid. Such a set of natural language scenarios can provide the descriptions of actions that occur as the software executes. Some of these actions can be explicit and required, while others can be due to errors arising or as a result of adapting to changing conditions as the system executes.

For example, if the system involves commanding space satellites, scenarios for that system can include sending commands to the satellites and processing data received in response to the commands. Natural language scenarios may be specific to the technology or application domain to which the natural language scenarios are applied. A fully automated general purpose approach covering all domains can be technically prohibitive to implement in a way that is both complete and consistent.

To ensure consistency, the domain of application can often be purpose-specific. For example, scenarios for satellite systems may not be applicable as scenarios for systems that manufacture agricultural chemicals.

FIG. 3 is a block diagram that provides an overview of a system 300 to generate a high-level computer source code program from an informal specification, according to an embodiment that includes a pattern matcher. System 300 may solve the need in the art for an automated, generally applicable way to produce a system that is a provably correct implementation of an informal design specification that does not require, in applying the system to any particular problem or application, the use of a theorem-prover. In some embodiments, system 300 requires less computing resources and time than required in using a theorem-prover, while still affording the benefits of using a theorem-prover such as reduced amount of testing required of a new system, and improved confidence that the systems reflects the requirements.

In some embodiments, system 300 is a software development system that includes a data flow and processing points for the data. System 300 can be representative of (i) computer applications and electrical engineering applications such as chip design and other electrical circuit design (ii) business management applications in areas such as workflow analysis, (iii) artificial intelligence applications in areas such as knowledge-based systems and agent-based systems, (iv) highly parallel and highly-distributed applications involving computer command and control and computer-based monitoring, (v) remote space vehicles such as autonomous nanotechnology swarm (ANTS) and moon and Mars exploration vehicles, (vi) recognition of protein sequences in DNA samples, identifying rogue agents in a software system, and identification of viruses or other malicious code in software systems and (vii) any other area involving process, sequence or algorithm design. According to the disclosed embodiments, system 300 can mechanically convert different types of specifications (either natural language scenarios or descriptions which are effectively pre-processed scenarios) into process-based formal specifications on which model checking and other mathematics-based verifications are performed, and then optionally convert the formal specification into code.

In some embodiments, system 300 includes an informal specification 102 having a plurality of rules or requirements. The informal specification 102 can be expressed in restricted natural language, graphical notations, English language, programming language representations, scenarios, or even using semi-formal notations such as unified modeling language (UML) use cases.

System 300 may also include a set of laws of concurrency 104. The informal specification 102 and a set of laws of concurrency 104 can be received by a mechanical pattern matcher 302. The plurality of rules or requirements of the informal specification 102 may be pattern-matched mechanically to a process-based specification 108 or other formal specification language representation. In some embodiments, the mechanical aspect means that no manual intervention in the translation is provided. In some embodiments, the process-based specification 108 is an intermediate notation or language of process algebra such as Hoare's language of Communicating Sequential Processes (CSP).

According to some embodiments, the pattern matcher 302 matches patterns of traces against the traces that would be generated by each of the laws of concurrency 104. The traces can be simplified versions of the scenarios. The traces generated by each law of concurrency 104 may be specified as a set in comprehension; that is, instead of listing all of the traces that a law would generate, a rule for generating this set is provided. A trace, or traces, can now be pattern matched against a set of traces generated by a law by comparing the trace(s) to the rule and seeing if it is admitted by the rule. A trace can match more than one rule, in which case the choice may be arbitrary (possibly resulting in an inefficient result, but this can be optimized later), or a trace can be based on some knowledge of the domain that can be encoded in a tool to perform the pattern matching.

The process-based specification 108 may be mathematically and provably equivalent to the informal specification 102. Mathematically equivalent does not necessarily mean mathematically equal. Mathematical equivalence of A and B means that A implies B and B implies A. Note that applying the laws of concurrency 104 to the process-based specification 108 might allow for the retrieval of a trace-based specification that is equivalent to the informal specification 102. Also, note that the process-based specification 108 may be mathematically equivalent to rather than necessarily equal to the original informal specification 102. This aspect may indicate that the process may be reversed, allowing for reverse engineering of existing systems, or for iterative development of more complex systems.

In some embodiments, the system includes an analyzer 110 to determine various properties such as existence of omissions, deadlock, livelock, and race conditions in the process-based specification 108.

System 300 may also includes a code translator 112 to translate the plurality of process-based specification segments 108 to a set of instructions in a high-level computer language program 114, such as the Java language.

In some embodiments, system 300 is operational for a wide variety of informal specification languages and applications, thus system 300 can be generally applicable. Such applications may include distributed software systems, sensor networks, robot operation, complex scripts for spacecraft integration and testing, chemical plant operation and control, and autonomous systems.

System 300 may provide mechanical regeneration of the executable system when requirements dictate a change in the high level specification. In some embodiments of system 300, all that is required to update the generated application is a change in the informal specification 102, and then the changes and validation can ripple through in a mechanical process when system 300 operates. This may also allow the possibility of cost effectively developing competing designs for a product and implementing each to determine the best one. Thus, system 300 can reduce system development time, reduce the amount of testing required of a new system, and improve confidence that the system reflects the requirements.

In some embodiments, system 300 does not include a theorem-prover to infer the process-based specification segments from the informal specification. However, the plurality of process-based specification segments 108 can be provably correct implementations of the informal specification 102, provided the developer of an instance of system 300 has properly used a theorem-prover (not shown) to prove that the mechanical pattern matcher 302 correctly translates informal specifications into formal specifications.

Some embodiments of system 300 operate in a multi-processing, multi-threaded operating environment on a computer, such as computer 1702 in FIG. 17. While the system 300 may not be limited to any particular informal specification 102, plurality of rules or requirements, set of laws of concurrency 104, mechanical pattern matcher 302, process-based specification 108, analyzer 110, code translator 112 and high-level computer language program 114, for sake of clarity a simplified informal specification 102, plurality of rules or requirements, set of laws of concurrency 104, pattern matcher 302, process-based specification 108, analyzer 110, code translator 112, and high-level computer language program 114 are described.

In some embodiments, system 300 relates to the fields of chemical or biological process design or mechanical system design, and, generally to any field where the behaviors exhibited by a process to be designed is described by a set of scenarios expressed in natural language, or some appropriate graphical notation or textual notation.

FIG. 4 is a block diagram that provides an overview of a system 400 to engineer an implementation from scenarios, according to an embodiment. System 400 may reduce system development time, reduce the amount of testing required of a new system, and improve confidence that the system reflects the requirements.

At least one embodiment of the system 400 is a software development system that includes a data flow and processing points for the data. According to the disclosed embodiments, system 400 can convert scenarios into an implementation on which model checking and other mathematics-based verifications can then be performed.

The system 400 can include a plurality of scenarios 202. The scenarios 202 can be written in a particular syntax, such as constrained natural language or graphical representations. The scenarios 202 can embody software applications, although one skilled in the art will recognize that other applications fall within the purview of this invention.

In at least one embodiment, the scenarios 202 are received by a pattern matcher 402. The optional inference engine 204 might be referenced by the pattern matcher 402 when the scenarios 202 are translated by the pattern matcher 402 into a formal specification 404. Subsequently, the formal specification 404 can be translated by a translator 408 into an implementation 410 in some appropriate scripting language or other implementation language. In some embodiments, no manual intervention in the translation is provided; thus, system 400 can improve confidence that the system reflects the requirements, which in turn can reduce the amount of testing required of a new system and reduce system development time. Those skilled in the art will readily understand that other appropriate notations and/or languages exist that are within the scope of this invention.

In some embodiments, system 400 can include an analyzer 406 to determine various properties of the formal specification, such as the existence of omissions, deadlock, livelock, and race conditions, as well as other conditions, in the formal specification 404, although one skilled in the art will recognize that other additional properties can be determined by the analyzer 406. The analyzer 406 may solve the need in the prior art to reduce errors.

In some embodiments, the implementation 410 can be mathematically and provably equivalent to the scenarios 202. Mathematically equivalent does not necessarily mean mathematically equal. Mathematical equivalence of A and B means that A implies B and B implies A. Note that the implementation 410 of some embodiments can be mathematically equivalent to, rather than necessarily equal to, the scenarios 202.

In some embodiments, the formal specification 404 can be a process-based specification, such as process algebra encoded notation. The process algebra encoded notation can be a mathematically notated form. This embodiment may satisfy the need in the art for an automated, mathematics-based process for requirements validation that does not require large computational facilities.

In some embodiments, the scenarios 202 of system 400 can specify allowed situations, events and/or results of a software system. In that sense, the scenarios 202 can provide a very abstract specification of the software system.

Some embodiments of system 400 can be operational for a wide variety of rules, computer instructions, computer languages and applications; thus, system 400 can be generally applicable. Such applications can include, without limitation, space satellite control systems, distributed software systems, sensor networks, robot operations, complex scripts for spacecraft integration and testing, chemical plant operation and control, autonomous systems, electrical engineering applications such as chip design and other electrical circuit design, business management applications in areas such as workflow analysis, artificial intelligence applications in areas such as knowledge-based systems and agent-based systems, highly parallel and highly-distributed applications involving computer command and control and computer-based monitoring, and any other area involving process, sequence or algorithm design. Hence, one skilled in the art will recognize that any number of other applications not listed can fall within the scope of this invention.

Some embodiments of the system 400 can provide mechanical or automatic generation of the implementation 410, in which human intervention is not required. In at least one embodiment of the system 400, all that may be required to update the generated application is a change in the scenarios 202, in which case the changes and validation can ripple through the entire system without human intervention when system 400 operates. This also allows the possibility of cost effectively developing competing designs for a product and implementing each to determine the best one.

Some embodiments of the system 400 do not include an automated logic engine, such as a theorem-prover or an automated deduction engine, to infer the implementation 410 from the scenarios 202. However, the implementation 410 can be a provably correct version of the scenarios 202.

Thus, in regards to implementations, automatic code generation of system 400 can generate an implementation in suitable scripting language or device control language (such as for a robot) that would provide the procedures, once validated, to be automatically transformed into an implementation. Additionally, system 400 can be used to "reverse engineer" existing implementation so that the implementation can be analyzed and corrected and recast in a format and form that can be more easily understood. System 400 also can be used to reverse engineer multiple existing implementations (even written in different languages) to a single formal model by which the implementations may be combined, analyzed for conflicts, and regenerated as a single implementation (in the same or a different procedure/scripting language).

Some embodiments of system 400 operate in a multi-processing, multi-threaded operating environment on a computer, such as the computer 1702 illustrated in FIG. 17. While the system 400 is not limited to any particular scenarios 202, inference engine 204, pattern matcher 402, formal specification 404, analyzer 406, translator 408 and implementation 410, for sake of clarity, embodiments of simplified scenarios 202, inference engine 204, pattern matcher 402, formal specification 404, analyzer 406, translator 408 and an implementation 410 are described.

In some embodiments, the system 400 is a software development system that can include a data flow and processing points for the data. System 400 can be representative of (i) computer applications and electrical engineering applications such as chip design and other electrical circuit design, (ii) business management applications in areas such as workflow analysis, (iii) artificial intelligence applications in areas such as knowledge-based systems and agent-based systems, (iv) highly parallel and highly-distributed applications involving computer command and control and computer-based monitoring, and (v) any other area involving process, sequence or algorithm design. One skilled in the art, however, will recognize that other applications can exist that are within the purview of this invention. According to the disclosed embodiments, system 400 can, without human intervention, convert different types of specifications (such as natural language scenarios or descriptions which are effectively pre-processed scenarios) into a formal specification on which model checking and other mathematics-based verifications are performed, and then optionally translate the formal specification into code or some other implementation.

System 400 can be operational for a wide variety of languages for expressing requirements; thus, system 400 can be generally applicable. Such applications include, without limitation, distributed software systems, sensor networks, robot operation, complex scripts for spacecraft integration and testing, chemical plant operation and control, and autonomous systems. One skilled in the art will understand that these applications are cited by way of example and that other applications can fall within the scope of the invention.

Method Embodiments

In the previous section, a system level overview of the operation of some embodiments are described. In this section, the particular methods of some such embodiments are described by reference to a series of flowcharts. Describing the methods by reference to a flowchart enables one skilled in the art to develop such programs, firmware, or hardware, including instructions to carry out the methods on suitable computers and executing the instructions from computer-readable media. Similarly, the methods performed by the server computer programs, firmware, or hardware may also be composed of computer-executable instructions. Methods 500-1600 may be performed by a program executing on, or performed by, firmware or hardware that is a part of a computer, such as computer 1702 in FIG. 17.

Figure 5:
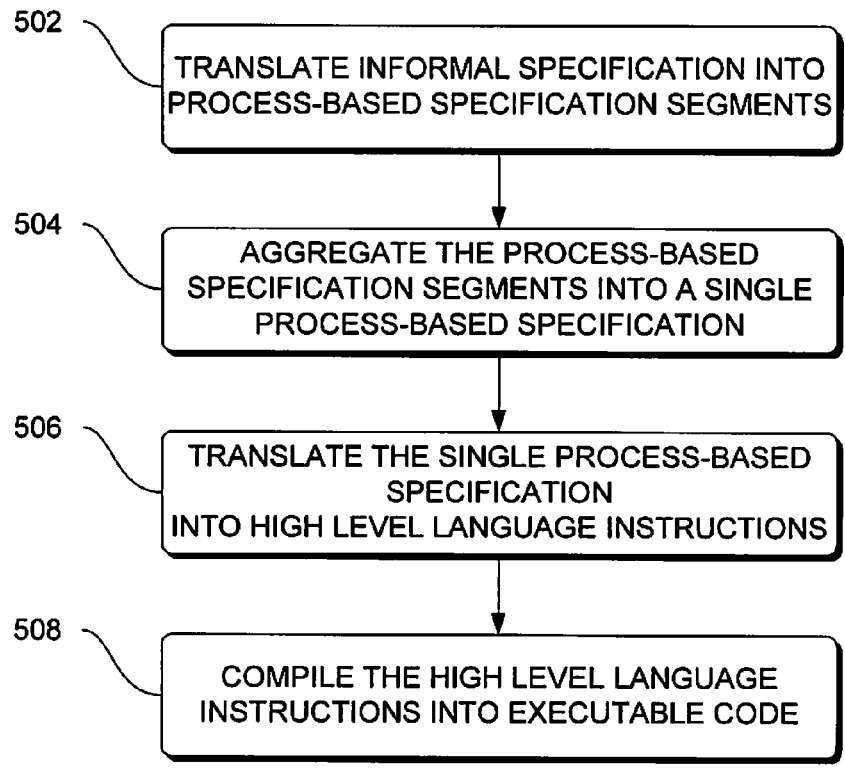
FIG. 5 is a flowchart of a method to generate an executable system from an informal specification, according to an embodiment.

FIG. 5 is a flowchart of a method 500 to generate an executable system from an informal specification, according to an embodiment. Method 500 may solve the need in the art to generate executable computer instructions from requirements with neither the time involved in manually writing the executable computer instructions, nor the mistakes that may arise in manually writing the executable computer instructions, without using a theorem-prover.

Figure 6:
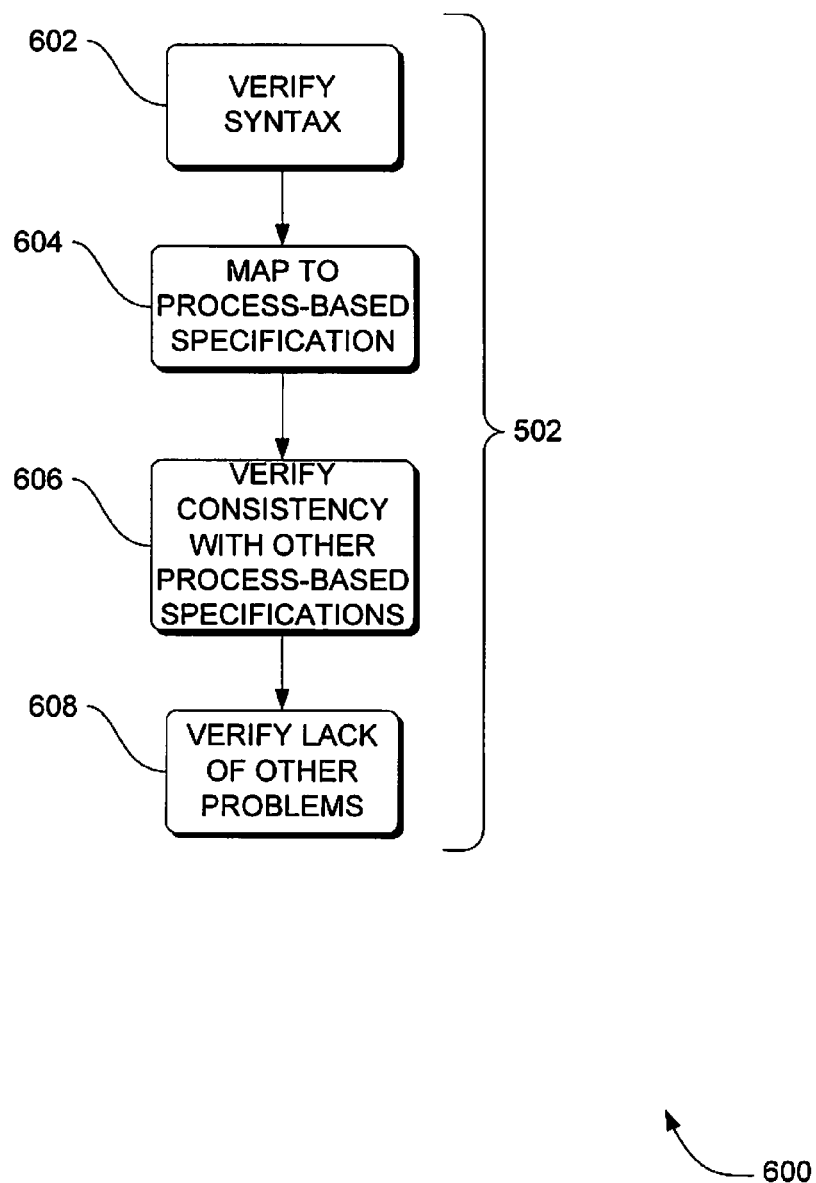
FIG. 6 is a flowchart of a method to translate mechanically each of a plurality of requirements of the informal specification to a plurality of process-based specification segments, according to an embodiment.

Method 500 may include translating 502 mechanically each of a plurality of requirements of the informal specification to a plurality of process-based specification segments. In some embodiments, the translating 502 includes inferring the process-based specification segments from the informal specification. One embodiment of translating 502 is shown in FIG. 6 below.

In some embodiments, the process-based specification can be process algebra notation. Such embodiments may satisfy the need in the art for an automated, mathematics-based process for requirements validation that does not require large computational facilities.

Thereafter, method 500 may include aggregating 504 the plurality of process-based specification segments into a single process-based specification or model.

Subsequently, method 500 may include translating 506 the single process-based specification model to instructions encoded in the Java computer language or some other high-level computer programming language. Thereafter, method 500 may include compiling 508 the instructions encoded in the Java computer language or other high-level computer programming language into a file of executable instructions.

In some embodiments, method 500 includes invoking the executable instructions, which can provide a method to convert informal specifications to an application system without involvement from a computer programmer.

Some embodiments of method 500 do not include invoking a theorem-prover to infer the process-based specification segments from the informal specification.

FIG. 6 is a flowchart of a method 600 to translate mechanically each of a plurality of requirements of the informal specification to a plurality of process-based specification segments, according to an embodiment. Method 600 may include at least one embodiment of translating 502 in FIG. 5.

According to some embodiments, method 600 includes verifying 602 the syntax of the plurality of requirements of the informal specification. Thereafter, method 600 may include mapping 604 the plurality of requirements of the informal specification to a process-based specification.

In some embodiments, method 600 subsequently also includes verifying 606 consistency of the process-based specification with at least one other process-based specification. In some embodiments, method 600 subsequently also includes verifying 608 lack of other problems in the process-based specification. One example of other problems can be unreachable states in the process defined in the process-based specification.

Figure 7:
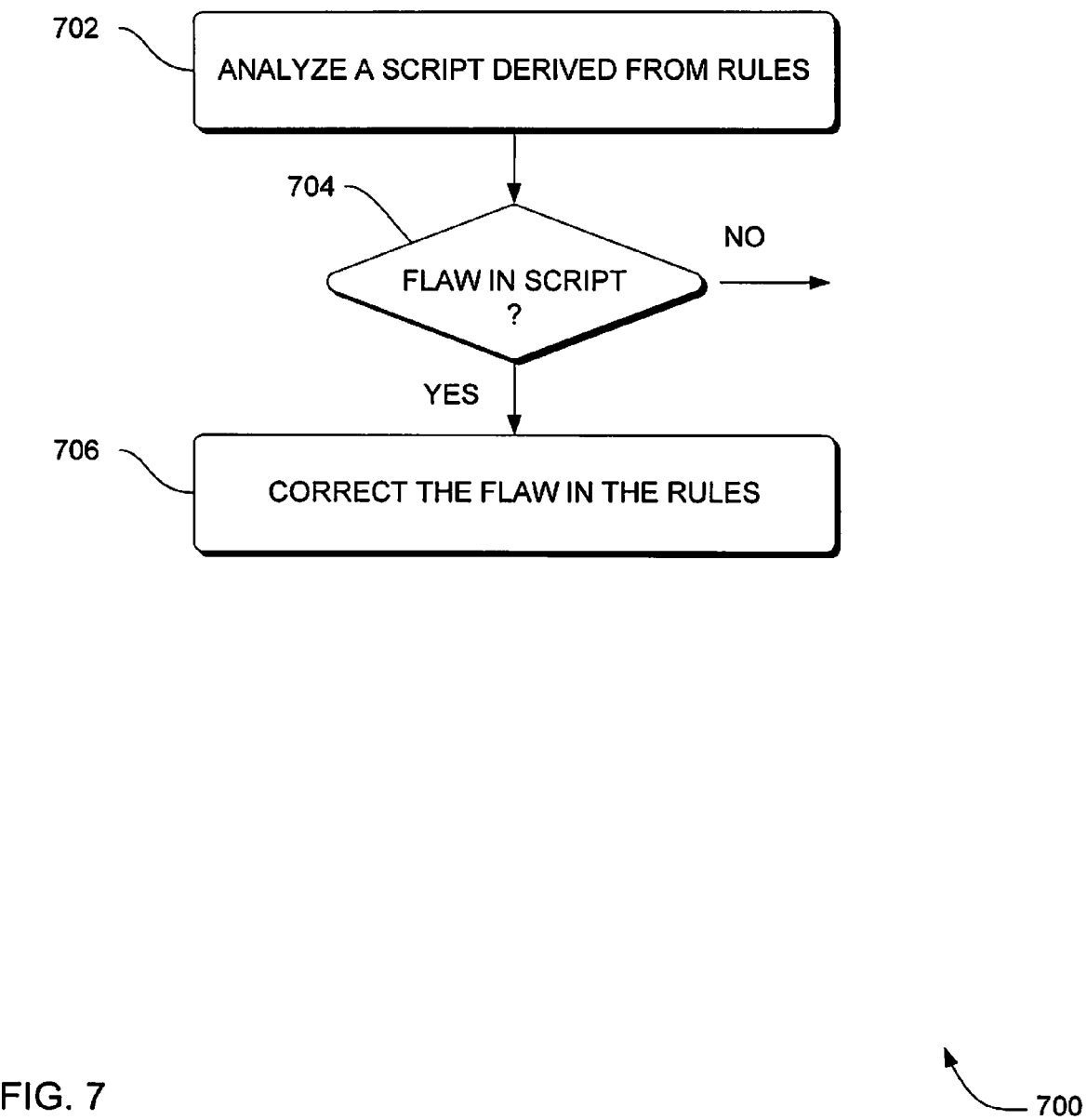
FIG. 7 is a flowchart of a method to verify the syntax of a set of scenarios, translate the set of scenarios to a formal specification, verify the consistency of the formal specification, and verify the absence of other problems, according to an embodiment.

FIG. 7 is a flowchart of a method 700 to validate/update a system, according to an embodiment. Method 700 may solve the need in the prior art to reduce errors in scripts.

Method 700 can include analyzing 702 a script, such as script 214, of the system 200, the script having been previously derived from the rules of the system.

Thereafter, a determination 704 can be made as to whether or not the analyzing 702 indicates that the script contains a flaw. If a flaw does exist, then the rules can be corrected 706 accordingly.

In some embodiments, the analyzing 702 can include applying mathematical logic to the script in order to identify a presence or absence of mathematical properties of the script. Mathematical properties of the script that can be determined by applying mathematical logic to the script can include, by way of example:

1) whether or not the script implies a system execution trace that includes a deadlock condition, and
2) whether or not the script implies a system execution trace that includes a livelock condition.

The above two properties can be domain independent. One skilled in the art will note that there are many other possible flaws that could be detected through the analysis of the model, many, or even most, of which might be domain dependent. An example of a domain dependent property could be represented by the operational principle that "closing a door that is not open is not a valid action." This example could be applicable in the domain of the Hubble Space Telescope on-orbit repair.

Because in some embodiments the script can be provably equivalent to the scenarios by virtue of method 700, if a flaw is detected in the script, then the flaw could be corrected by changing (correcting) the scenarios. Once the correction is made, then the corrected scenarios can be processed by system 200 in FIG. 2 or method 800 in FIG. 8 to derive a new script from the corrected scenarios. According to at least one embodiment, the new script can be processed by method 700, and the iterations of method 800 and method 700 can repeat until there are no more flaws in the script generated from the scenarios, at which point the scenarios have no flaws because the script is provably equivalent to the scenarios from which it was derived. Thus, iterations of methods 800 and 700 can provide verification/validation of the scenarios.

Thereafter, the new script can be used to generate an implementation of the system.

Figure 8:
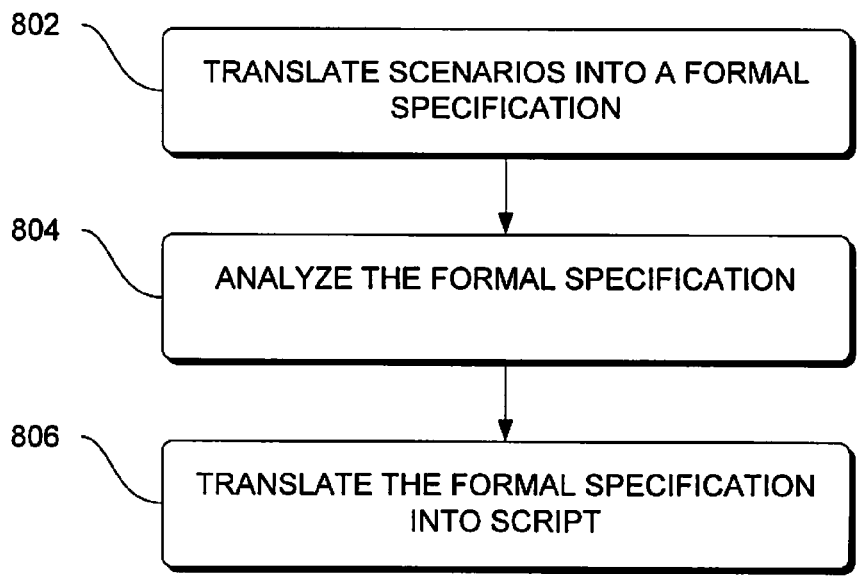
FIG. 8 is a flowchart of a method to validate/update scenarios of a system, according to an embodiment.

FIG. 8 is a flowchart of a method to validate/update scenarios of a system, according to an embodiment. The method 800 can include translating 802 scenarios, such as the scenarios 202, into a formal specification 208 without human intervention.

Thereafter, method 800 can include optionally analyzing 804 the formal model or specification 208. The analyzing 804 can be a verification/validation of the scenarios 202. In some embodiments, the analyzing 804 determines various properties such as existence of omissions, deadlock, livelock, and race conditions in the script 214, although one skilled in the art will know that analyzing the formal model can determine other properties not specifically listed, which are contemplated by this invention. In some embodiments, the analyzing 804 can provide a mathematically sound analysis of the scenarios 202 in a general format that doesn't require significant understanding of the specific rules of the scenarios 202. Further, the analyzing 804 can warn developers of errors in their scenarios 202, such as contradictions and inconsistencies, but equally importantly it can highlight rules or sets of rules that are underspecified or over-specified and need to be corrected for the scenarios 202 to operate as intended. Thus, no knowledge of the scenarios 202 may be required, but instead significant analysis, verification, testing, simulation and model checking of the scenarios 202 using customized tools or existing tools and techniques can be provided.

Thereafter, in some embodiments, method 800 can include translating 806 the formal specification 208 to a script 214. Thus, in at least one embodiment, the method 800 provides a method to convert scenarios to scripts without involvement from a computer programmer.

Some embodiments of the method 800 do not include invoking an automated logic engine, such as a theorem-prover, to infer the script 214 from the scenarios 202.

In some embodiments of the method 800, informal representations of requirements for procedures/scripts that represent the operation of a system can be mechanically converted to a mathematically sound specification that can be analyzed for defects and used for various transformations including automatic translation into executable form and automatic regeneration of procedures/scripts into other notations/representations. In other embodiments, the method disclosed herein can be used to automatically reverse engineer existing procedures and scripts to formal models from which the method can be used to produce customer-readable representations of procedures/scripts or machine-processable scripts in any of various scripting languages.

Mathematically sound techniques can be used to mechanically translate an informal procedure/script requirement into an equivalent formal model. The model may be mechanically (that is, with no manual intervention) manipulated, examined, analyzed, verified, and used in a simulation.

Figure 9:
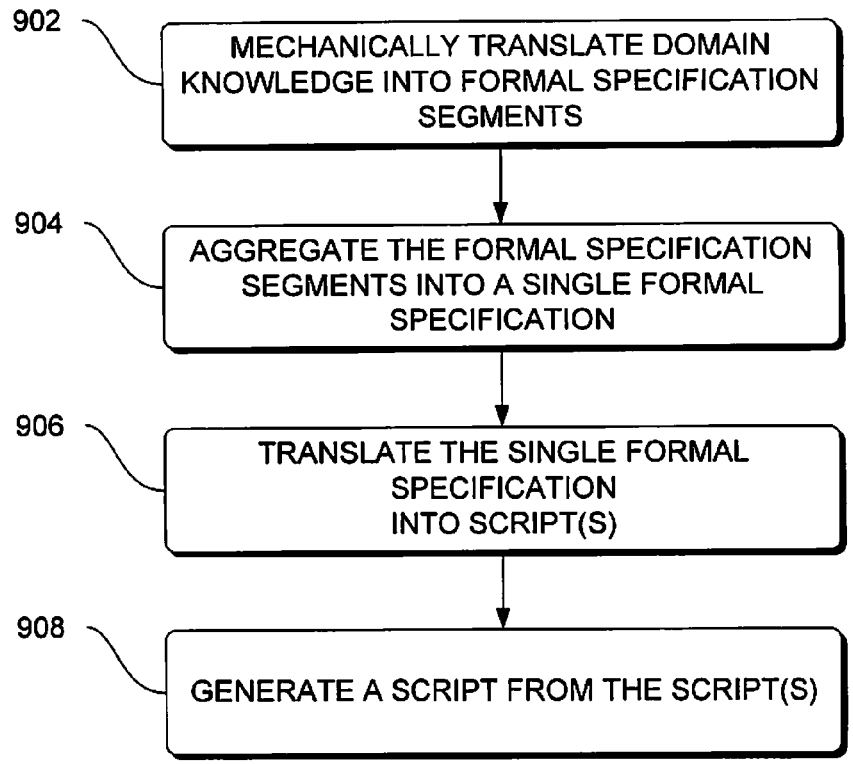
FIG. 9 is a flowchart of a method to translate each of a plurality of requirements of the domain knowledge to a plurality of formal specification segments, and formally compose the plurality of formal specification segments into a single equivalent specification, and translate the single formal specification into a script, according to an embodiment.

FIG. 9 is a flowchart of a method 900 to translate each of a plurality of requirements to a plurality of formal specification segments, and formally compose the plurality of formal specification segments into a single equivalent specification, and translate the single formal specification into a script, according to an embodiment. Method 900 may solve the need in the art to generate scripts from requirements with neither the time involved in manually writing the scripts, nor the mistakes that can arise in manually writing the scenarios, without using an automated logic engine.

Figure 10:
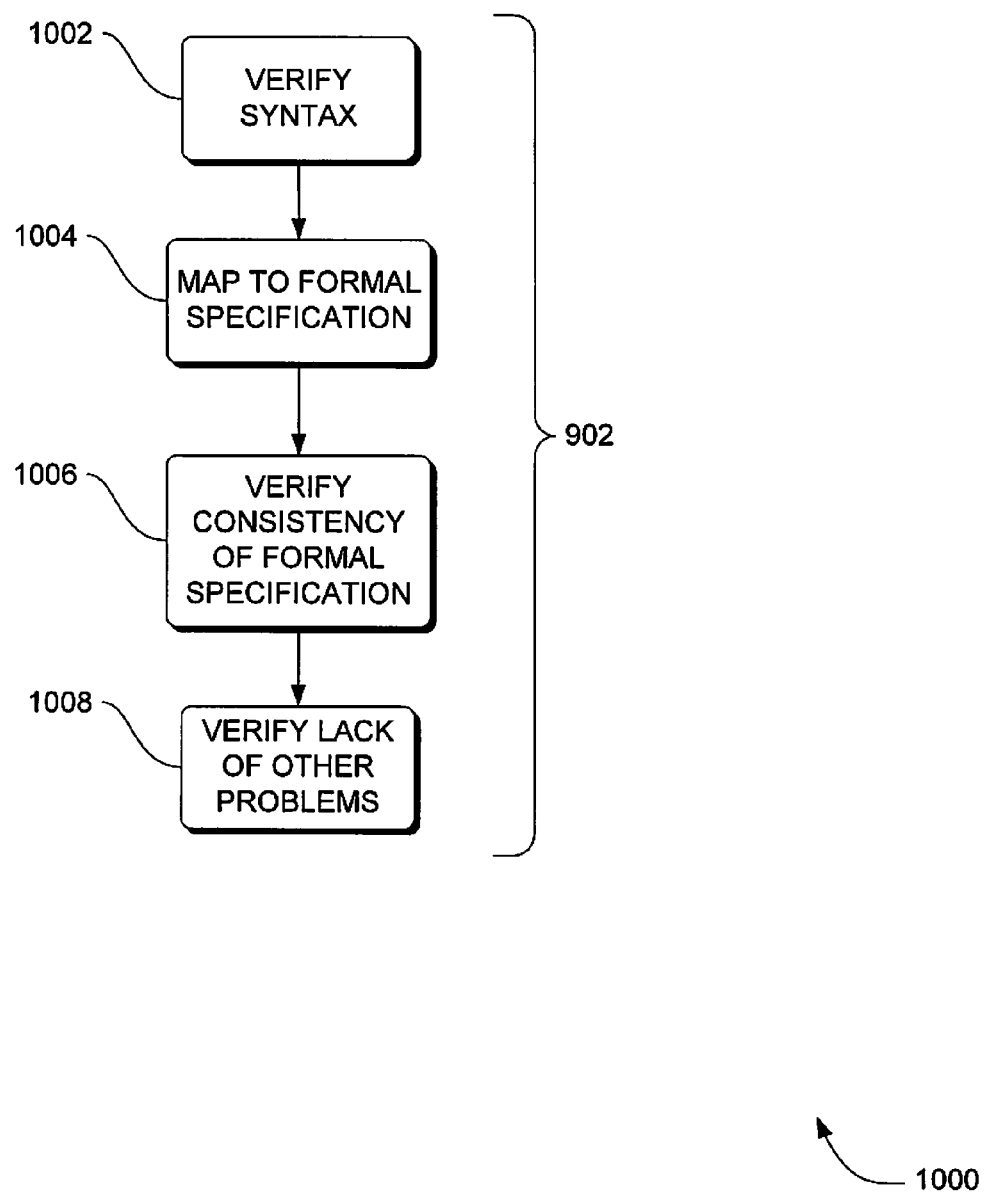
FIG. 10 is a flowchart of a method to generate a formal specification from scenarios, according to an embodiment.

Method 900 can include mechanically translating 902 each of a plurality of scenarios to a plurality of formal specification segments. The translation can be done without human intervention. One embodiment of translating 902 is shown in FIG. 10 below.

Thereafter, method 900 can include aggregating 904 the plurality of formal specification segments into a single formal specification or model.

Subsequently, method 900 can include translating 906 the single formal specification or model to multiple scripts. Thereafter, method 900 can include generating 908 a script from the scripts that were accepted from translating 906. Thus, method 900 can provide at least one embodiment of a method to convert a script to an application system without involvement from a computer programmer.

Some embodiments of method 900 do not include invoking a theorem-prover or any other automated logic engine to infer the formal specification segments from the scenarios.

FIG. 10 is a flowchart of a method 1000 to verify the syntax of a set of scenarios, translate the set of scenarios to a formal specification, verify the consistency of the formal specification, and verify the absence of other problems, according to an embodiment. Method 1000 can be one embodiment of translating 802 in FIG. 8. As indicated, such translation can be accomplished without human intervention.

In some embodiments, the method 1000 can include verifying 1002 the syntax of the plurality of scenarios. Thereafter, method 1000 can include mapping 1004 the plurality of scenarios to a formal specification.

In some embodiments, method 1000 subsequently can also include verifying 1006 consistency of the formal specification. In some embodiments, method 1000 subsequently also includes verifying 1008 a lack of other problems in the formal specification. One example of other problems may be unreachable states in the process defined in the formal specification, although one skilled in the art will understand that yet other problems are contemplated.

Figure 11:
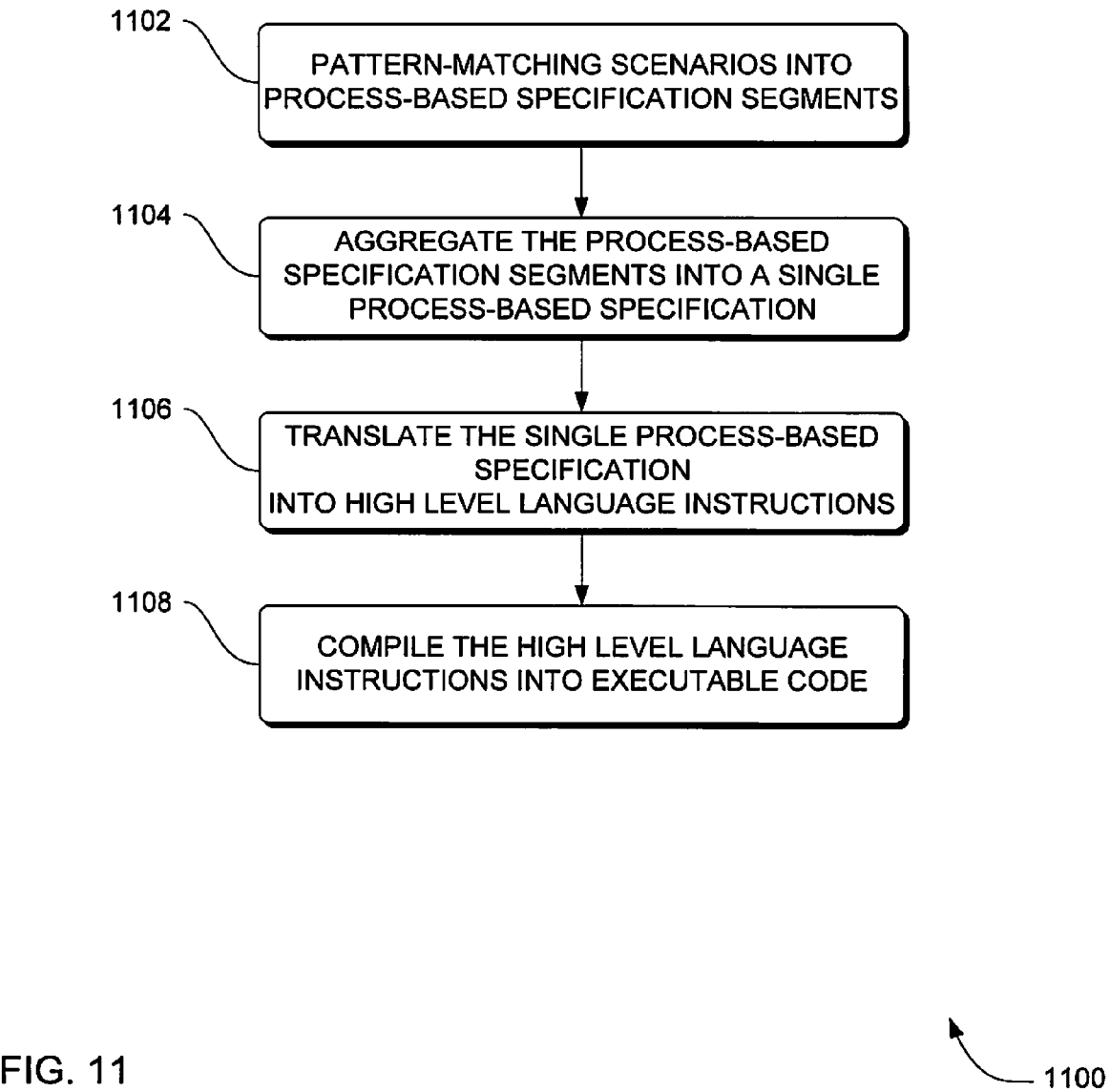
FIG. 11 is a flowchart of a method to generate an executable system from an informal specification, according to an embodiment.

FIG. 11 is a flowchart of a method 1100 to generate an executable system from an informal specification, according to an embodiment. Method 1100 may solve the need in the art to generate executable computer instructions from requirements with neither the time nor the mistakes involved in manually writing the executable computer instructions, without using a theorem-prover.

Figure 12:
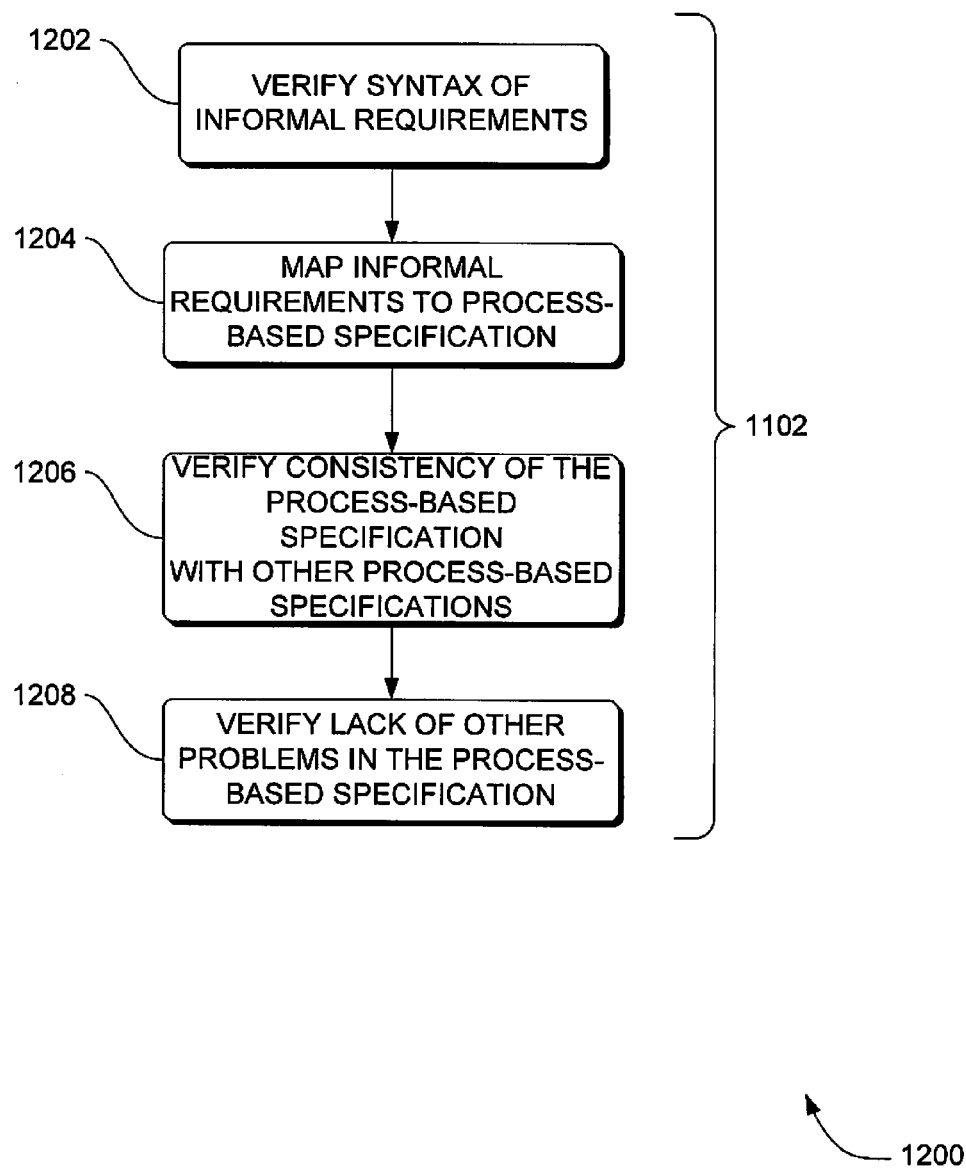
FIG. 12 is a flowchart of a method to translate mechanically each of a plurality of requirements of the informal specification to a plurality of process-based specification segments, according to an embodiment.

Some embodiments of method 1100 include mechanically pattern-matching 1102 each of a plurality of scenarios of an informal specification to a plurality of process-based specification segments. In some embodiments, the pattern-matching 1102 includes inferring the process-based specification segments from the scenarios. One embodiment of pattern-matching 1102 is shown in FIG. 12 below.

In some embodiments, the process-based specification is process algebra notation. That embodiment may satisfy the need in the art for an automated, mathematics-based process for requirements validation that does not require large computational facilities.

Thereafter, some embodiments of method 1100 can include aggregating 1104 the plurality of process-based specification segments into a single process-based specification or model.

Subsequently, method 1100 may include translating 1106 the single process-based specification or model to instructions encoded in the Java computer language or some other high-level computer programming language. Thereafter, method 1100 may include compiling 1108 the instructions encoded in the high level computer programming language into a file of executable instructions or code.

In some embodiments, method 1100 includes generating the executable instructions, which can provide a method to convert informal specifications to an application system without involvement from a computer programmer.

Some embodiments of method 1100 do not include invoking a theorem-prover to infer the process-based specification segments from the informal specification.

FIG. 12 is a flowchart of a method 1200 to translate mechanically each of a plurality of requirements of the informal specification to a plurality of process-based specification segments, according to an embodiment. Method 1200 is one embodiment of pattern-matching 1102 in FIG. 11.

Method 1200 may include verifying 1202 the syntax of the plurality of informal requirements of the specification. Thereafter, method 1200 may include mapping 1204 the plurality of informal requirements of the specification to a process-based specification.

In some embodiments, method 1200 subsequently also includes verifying 1206 consistency of the process-based specification with at least one other process-based specification. In some embodiments, method 1200 subsequently also includes verifying 1208 a lack of other problems in the process-based specification. One example of other problems might include unreachable states in the process defined in the process-based specification.

Figure 13:
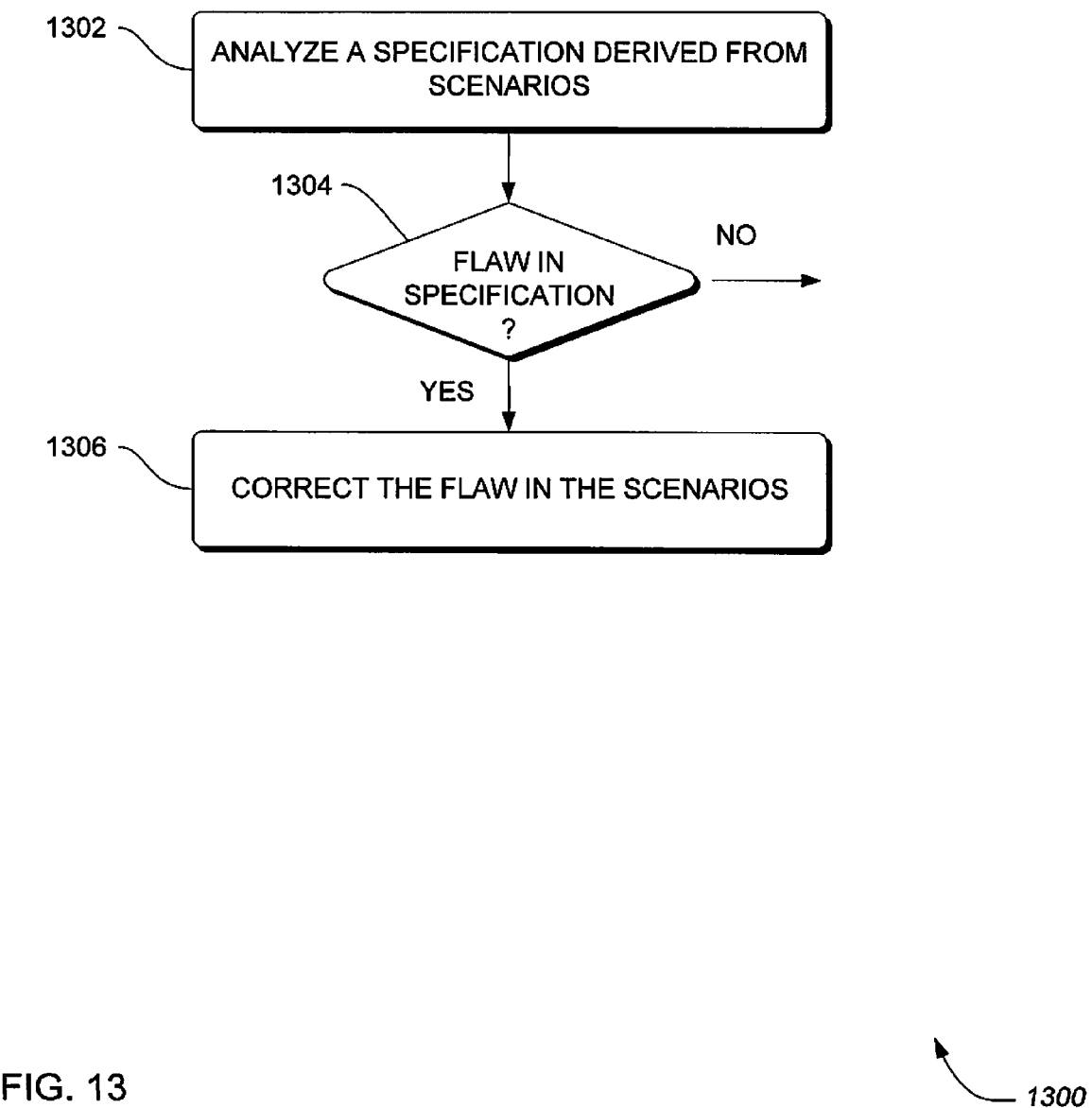
FIG. 13 is a flowchart of a method to validate/update a system, according to an embodiment.

FIG. 13 is a flowchart of a method 1300 to validate/update a system, according to an embodiment. Method 1300 may solve the need in the prior art to reduce errors in specifications.

Method 1300 can include analyzing 1302 a specification, such as formal specification 208 of the system, the specification having been previously derived from the scenarios of the system.

In some embodiments, the analyzing 1302 can include applying mathematical logic to the specification in order to identify a presence or absence of mathematical properties of the specification. Mathematical properties of the specification that can be determined by applying mathematical logic to the specification can include, by way of example:

1) whether or not the specification implies a system execution trace that includes a deadlock condition, and 2) whether or not the specification implies a system execution trace that includes a livelock condition.

The above two properties can be domain independent. One skilled in the art will note that there are many other possible flaws that could be detected through the analysis of the model, many or even most of which might be domain dependent. An example of a domain dependent property would be represented by the operational principle that "closing a door that is not open is not a valid action." This example could be applicable in the domain of the Hubble Space Telescope on-orbit repair.

Because in some embodiments the specification can be provably equivalent to the scenarios by virtue of method 1300, if a flaw is detected in the specification, then the flaw could be corrected by changing (correcting) the scenarios. Once the correction is made, then the corrected scenarios can be processed by system 200 in FIG. 2 or method 1400 in FIG. 14 to derive a new specification from the corrected scenarios. According to at least one embodiment, the new specification can be processed by method 1300, and the iterations of method 1400 and method 1300 can repeat until there are no more flaws in the specification generated from the scenarios, at which point the scenarios have no flaws because the specification can be provably equivalent to the scenarios from which it was derived. Thus, iterations of methods 1400 and 1300 can provide verification/validation of the scenarios.

Thereafter, a determination 1304 can be made as to whether or not the analyzing 1302 indicates that the specification contains a flaw. If a flaw does exist, then the rules/scenarios/requirements can be corrected 1306 accordingly.

Thereafter, the new specification can be used to generate an implementation of the system.

Figure 14:
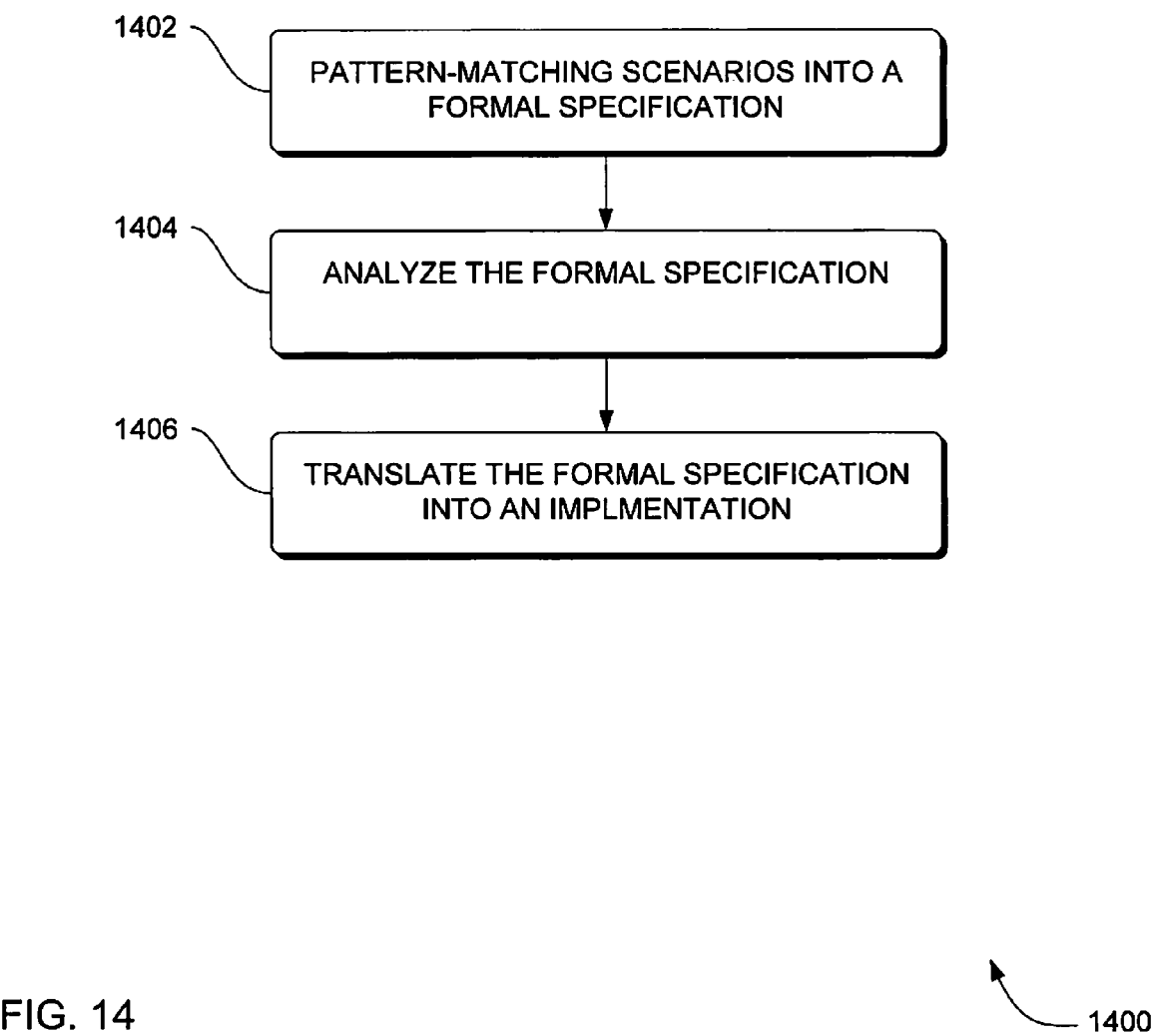
FIG. 14 is a flowchart of a method to pattern-match scenarios into a formal specification, analyze the formal specification, and translate the formal specification into CSP, according to an embodiment.

FIG. 14 is a flowchart of a method to pattern-match scenarios into a formal specification, analyze the formal specification, and translate the formal specification into an implementation, according to an embodiment.

Method 1400 can include pattern-matching 1402 scenarios, such as scenarios 202, into a formal model or specification without human intervention. Thereafter, method 1400 can include analyzing 1404 the formal specification or model. The analyzing 1404 can be a verification/validation of the scenarios 202. In some embodiments, the analyzing 1404 determines various properties such as existence of omissions, deadlock, livelock, and race conditions in the formal specification, although one skilled in the art will know that analyzing the formal model can determine other properties not specifically listed, which are contemplated in method 1400. In some embodiments, the analyzing 1404 can provide a mathematically sound analysis of the scenarios 202 in a general format that doesn't require significant understanding of the specific rules of the scenarios 202. Further, the analyzing 1404 can warn developers of errors in their scenarios 202, such as contradictions and inconsistencies, but equally importantly, it can highlight rules or sets of rules that are underspecified or over-specified and need to be corrected for the scenarios 202 to operate as intended. Thus, in some embodiments, no knowledge of the scenarios 202 is required, but instead significant analysis, verification, testing, simulation and model checking of the scenarios 202 using customized tools or existing tools and techniques is provided.

Thereafter, in some embodiments, method 1400 can include translating 1406 the formal specification into an implementation, such as implementation 214. Thus, in at least one embodiment, the method 1400 provides a method to convert scenarios to implementations without involvement from a computer programmer.

Some embodiments of the method 1400 do not include invoking an automated logic engine, such as a theorem-prover, to infer the implementation 214 from the scenarios 202.

In method 1400, informal representations of requirements for implementations that represent the operation of a system can be mechanically converted to a mathematically sound specification that can be analyzed for defects and used for various transformations, including automatic translation into executable form and automatic regeneration of implementations into other notations/representations. In some embodiments, the method disclosed herein can be used to automatically reverse engineer existing implementations to formal models or specifications from which the method can be used to produce customer-readable representations of implementations or machine-processable implementations in any of various languages.

Mathematically sound techniques can be used to mechanically translate an informal scenario requirement into an equivalent formal specification or model. The model may be mechanically (that is, with no manual intervention) manipulated, examined, analyzed, verified, and used in a simulation.

Figure 15:
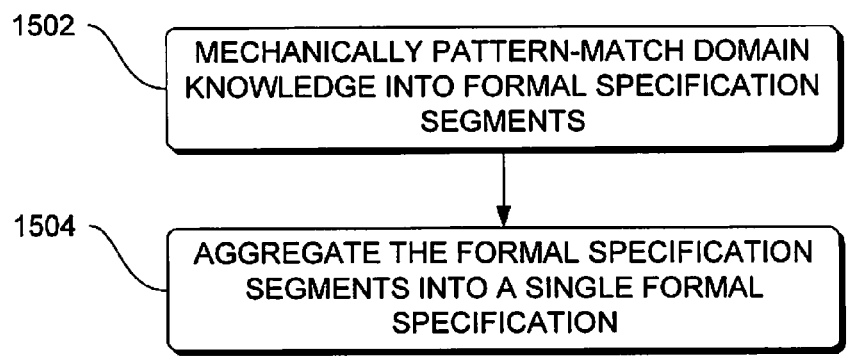
FIG. 15 is a flowchart of a method to translate each of a plurality of requirements of the domain knowledge to a plurality of formal specification segments, and formally compose the plurality of formal specification segments into a single equivalent specification, according to an embodiment.

FIG. 15 is a flowchart of a method 1500 to translate each of a plurality of requirements to a plurality of formal specification segments, and formally compose the plurality of formal specification segments into a single equivalent specification, according to an embodiment. Method 1500 can solve the need in the art to generate scenarios from requirements with neither the time involved nor the mistakes that can arise in manually writing the scenarios, without using an automated logic engine.

Method 1500 can include mechanically pattern-matching 1502 domain knowledge to a plurality of formal specification segments. The translation can be done without human intervention. One embodiment of pattern-matching 1502 is shown in FIG. 16 below.

Thereafter, method 1500 can include aggregating 1504 the plurality of formal specification segments into a single formal specification or model.

Some embodiments of method 1500 do not include invoking a theorem-prover or any other automated logic engine to infer the implementation from the domain knowledge.

Figure 16:
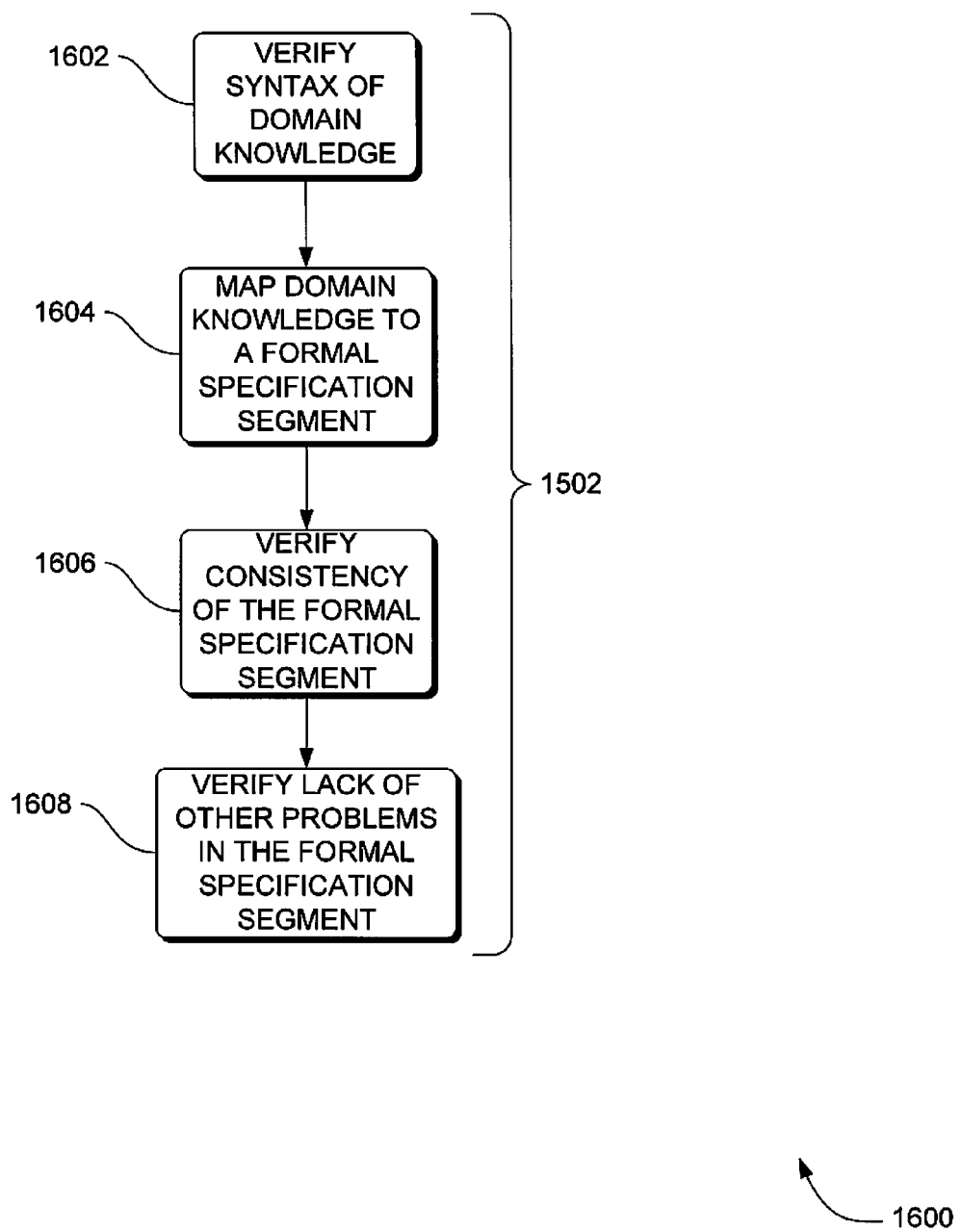
FIG. 16 is a flowchart of a method to generate a formal specification from domain knowledge, according to an embodiment.

FIG. 16 is a flowchart of a method 1600 to verify the syntax of a set of domain knowledge, translate the set of domain knowledge to a formal specification, verify the consistency of the formal specification, and verify the absence of other problems, according to an embodiment. Method 1600 can be one embodiment of pattern-matching 1502 in FIG. 15. As indicated, such translation can be accomplished without human intervention.

In some embodiments, the method 1600 can include verifying 1602 the syntax of the domain knowledge. Thereafter, method 1600 can include mapping 1604 the set of domain knowledge to a formal specification.

In some embodiments, method 1600 subsequently can also include verifying 1606 consistency of the formal specification segment. In some embodiments, method 1600 also subsequently includes verifying 1608 a lack of other problems in the formal specification. One example of other problems can be unreachable states in the process defined in the formal specification, although one skilled in the art will understand that yet other problems are contemplated.

In some embodiments, methods 500-1600 can be implemented as a computer data signal embodied in a carrier wave that represents a sequence of instructions, which, when executed by a processor, such as processor 1704 in FIG. 17, cause the processor to perform the respective method. In other embodiments, methods 500-1600 can be implemented as a computer-accessible medium having executable instructions capable of directing a processor, such as processor 1704 in FIG. 17, to perform the respective method. In varying embodiments, the medium can be a magnetic medium, an electronic medium, an electromagnetic medium, a medium involving configurations or spatial positioning of electrons, ions, atoms, or molecules or aggregations of such particles, a medium involving quantum mechanical entities, or an optical medium. Other mediums will be readily apparent to one skilled in the art and fall within the scope of this invention.

Hardware and Operating Environment

FIG. 17 is a block diagram of the hardware and operating environment 1700 in which different embodiments can be practiced. The description of FIG. 17 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment. Some embodiments can also be at least partially implemented in a quantum mechanical computing and communications environment.

Computer 1702 may include a processor 1704, commercially available from Intel, Motorola, Cyrix and others. Computer 1702 may also include random-access memory (RAM) 1706, read-only memory (ROM) 1708, and one or more mass storage devices 1710, and a system bus 1712, that operatively couples various system components to the processing unit 1704. The memory 1706, 1708, and mass storage devices, 1710, are types of computer-accessible media. Mass storage devices 1710 are more specifically types of nonvolatile computer-accessible media and can include one or more hard disk drives, floppy disk drives, optical disk drives, and tape cartridge drives. The processor 1704 can execute computer programs stored on the computer-accessible media.

Computer 1702 can be communicatively connected to the Internet 1714 (or any communications network) via a communication device 1716. Internet 1714 connectivity is well known within the art. In one embodiment, a communication device 1716 may be a modem that responds to communication drivers to connect to the Internet via what is known in the art as a "dial-up connection." In another embodiment, a communication device 1716 may be an Ethernet® or similar hardware network card connected to a local-area network (LAN) that itself is connected to the Internet via what is known in the art as a "direct connection" (e.g., TI line, etc.).

A user may enter commands and information into the computer 1702 through input devices such as a keyboard 1718 or a pointing device 1720. The keyboard 1718 can permit entry of textual information into computer 1702, as known within the art, and embodiments are not limited to any particular type of keyboard. Pointing device 1720 can permit the control of the screen pointer provided by a graphical user interface (GUI) of operating systems such as versions of Microsoft Windows®. Embodiments are not limited to any particular pointing device 1720. Such pointing devices may include mice, touch pads, trackballs, remote controls and point sticks. Other input devices (not shown) can include a microphone, joystick, game pad, gesture-recognition or expression recognition devices, or the like.

In some embodiments, computer 1702 may be operatively coupled to a display device 1722. Display device 1722 can be connected to the system bus 1712. Display device 1722 can permit the display of information, including computer, video and other information, for viewing by a user of the computer. Embodiments are not limited to any particular display device 1722. Such display devices may include cathode ray tube (CRT) displays (monitors), as well as flat panel displays such as liquid crystal displays (LCD's) or image and/or text projection systems or even holographic image generation devices. In addition to a monitor, computers typically may include other peripheral input/output devices such as printers (not shown). Speakers 1724 and 1726 (or other audio device) can provide audio output of signals. Speakers 1724 and 1726 can also be connected to the system bus 1712.

Computer 1702 may also include an operating system (not shown) that may be stored on the computer-accessible media RAM 1706, ROM 1708, and mass storage device 1710, and can be executed by the processor 1704. Examples of operating systems include Microsoft Windows®, Apple MacOS®, Linux®, UNIX®. Examples are not limited to any particular operating system, however, and the construction and use of such operating systems are well known within the art.

Embodiments of computer 1702 are not limited to any type of computer 1702. In varying embodiments, computer 1702 may comprise a PC-compatible computer, a MacOS®-compatible computer, a Linux®-compatible computer, or a UNIX®-compatible computer. The construction and operation of such computers are well known within the art.

Computer 1702 can be operated using at least one operating system to provide a graphical user interface (GUI) including a user-controllable pointer. Computer 1702 can have at least one web browser application program executing within at least one operating system, to permit users of computer 1702 to access an intranet, extranet or Internet world-wide-web pages as addressed by Universal Resource Locator (URL) addresses. Examples of browser application programs include Netscape Navigator® and Microsoft Internet Explorer®.

The computer 1702 can operate in a networked environment using logical connections to one or more remote computers, such as remote computer 1728. These logical connections can be achieved by a communication device coupled to, or a part of, the computer 1702. Embodiments are not limited to a particular type of communications device. The remote computer 1728 can be another computer, a server, a router, a network PC, a client, a peer device or other common network node. The logical connections depicted in FIG. 17 include a local-area network (LAN) 1730 and a wide-area network (WAN) 1732. Such networking environments are commonplace in offices, enterprise-wide computer networks, intranets, extranets and the Internet.

When used in a LAN-networking environment, the computer 1702 and remote computer 1728 can be connected to the local network 1730 through network interfaces or adapters 1734, which is one type of communications device 1716. Remote computer 1728 may also include a network device 1736. When used in a conventional WAN-networking environment, the computer 1702 and remote computer 1728 may communicate with a WAN 1732 through modems (not shown). The modem, which can be internal or external, may be connected to the system bus 1712. In a networked environment, program modules depicted relative to the computer 1702, or portions thereof, can be stored in the remote computer 1728.

Computer 1702 also includes power supply 1738. Each power supply can be a battery.

Apparatus Embodiments

CSP Implementation

Figure 18:
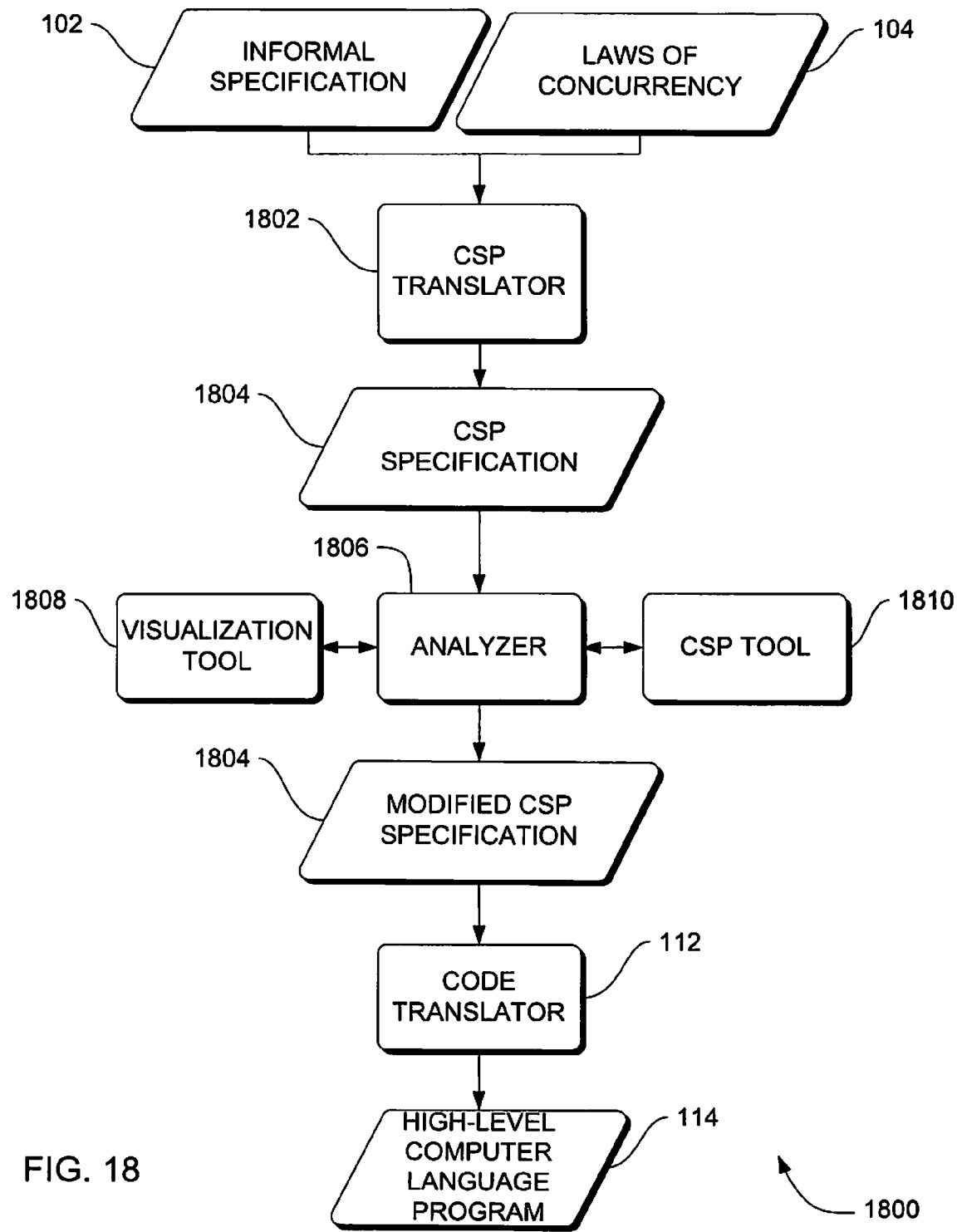
FIG. 18 is a block diagram of a particular CSP implementation of an apparatus to generate a high-level computer source code program from an informal specification, according to an embodiment.

Referring to FIG. 18, a particular CSP implementation 1800 is described in conjunction with the system overview in FIG. 1 and the methods described in conjunction with FIG. 3 and FIG. 6, according to an embodiment.

FIG. 18 is a block diagram of a particular CSP implementation of an apparatus 1800 to generate a high-level computer source code program from an informal specification, according to an embodiment. Apparatus 1800 may solve the need in the art for an automated, generally applicable way to produce a system that is a provably correct implementation of an informal design specification that does not require use of a theorem-prover.

Apparatus 1800 may include an informal specification 102 having a plurality of rules or requirements. The informal specification 102 can be expressed in restricted natural language, graphical notations, or even using semi-formal notations such as unified modeling language (UML) use cases. Apparatus 1800 may also include a set of laws of concurrency 104.

The informal specification 102 and a set of laws of concurrency 104 may be received by a mechanical CSP translator 1802. The plurality of rules or requirements of the informal specification 102 can be translated mechanically to a CSP specification 1804 encoded in Hoare's language of Communicating Sequential Processes (CSP). In some embodiments, the mechanical CSP translator 1802 performs action 302 in FIG. 3.

In some embodiments, the system may include a formal specification analyzer 1806 to perform model verification/checking and determine existence of omissions, deadlock, livelock and race conditions in the CSP specification 1804. In some embodiments, the formal specification analyzer 1806 receives and transmits information from and to a visualization tool 1808 that can provide a way to modify the CSP specification 1804. In some embodiments, the formal specification analyzer 1806 receives and transmits information from and to a tool 1810 designed for CSP that provides a way to modify the CSP specification 1804.

The formal specification analyzer 1806 may generate a modified CSP specification 1812 that may in turn be received by a code translator or compiler 112 to translate the modified CSP specification 1808 to a set of instructions in a high-level computer language program 114, such as Java language.

CSP specification analyzer 1806 may allow the user to manipulate the CSP specification 1804 in various ways. The analyzer 1806 may allow the user to examine the system described by the informal specification 102, and to manipulate it. The CSP specification 1804 may be analyzed to highlight undesirable behavior, such as race conditions, and equally important, to point out errors of omission in the informal specification 102. The CSP specification analyzer 1806 can be an optional but useful stage in the disclosed embodiments of the present invention. If the analyzer 1806 is not used, then the process-based specification 108 and the modified CSP specification 1804 may be identical. Hence, if the CSP analyzer 1806 is not used, then all references to the modified CSP specification 1812 disclosed below may also apply to the CSP specification 1804.

Some embodiments of apparatus 1800 do not include a theorem-prover to infer the process-based specification segments from the informal specification.

Apparatus 1800 can be operational for a wide variety of informal specification languages and applications, and thus apparatus 1800 may be generally applicable. Such applications may include distributed software systems, sensor networks, robot operation, complex scripts for spacecraft integration and testing, and autonomous systems.

Apparatus 1800 components of the mechanical CSP translator 1802, the formal specification analyzer 1806, visualization tool 1808, CSP tool 1810 and the code translator 112 can be embodied as computer hardware circuitry or as a computer-readable program, or a combination of both, such as shown in FIG. 18. In another embodiment, apparatus 1800 can be implemented in an application service provider (ASP) system.

Figure 19:
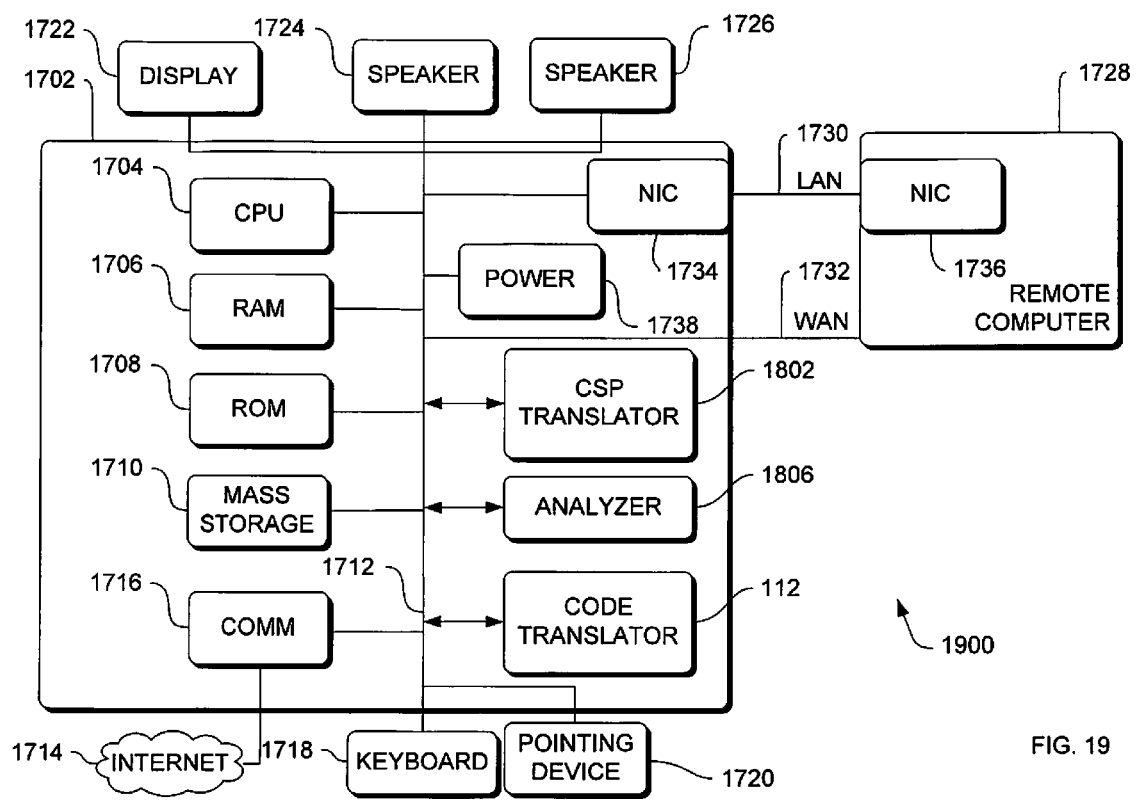
FIG. 19 is a block diagram of a hardware and operating environment in which a particular CSP implementation of FIG. 18 is implemented, according to an embodiment.

FIG. 19 is a block diagram of a hardware and operating environment in which a particular CSP implementation of FIG. 18 may be implemented, according to an embodiment.

Script Implementation

Figure 20:
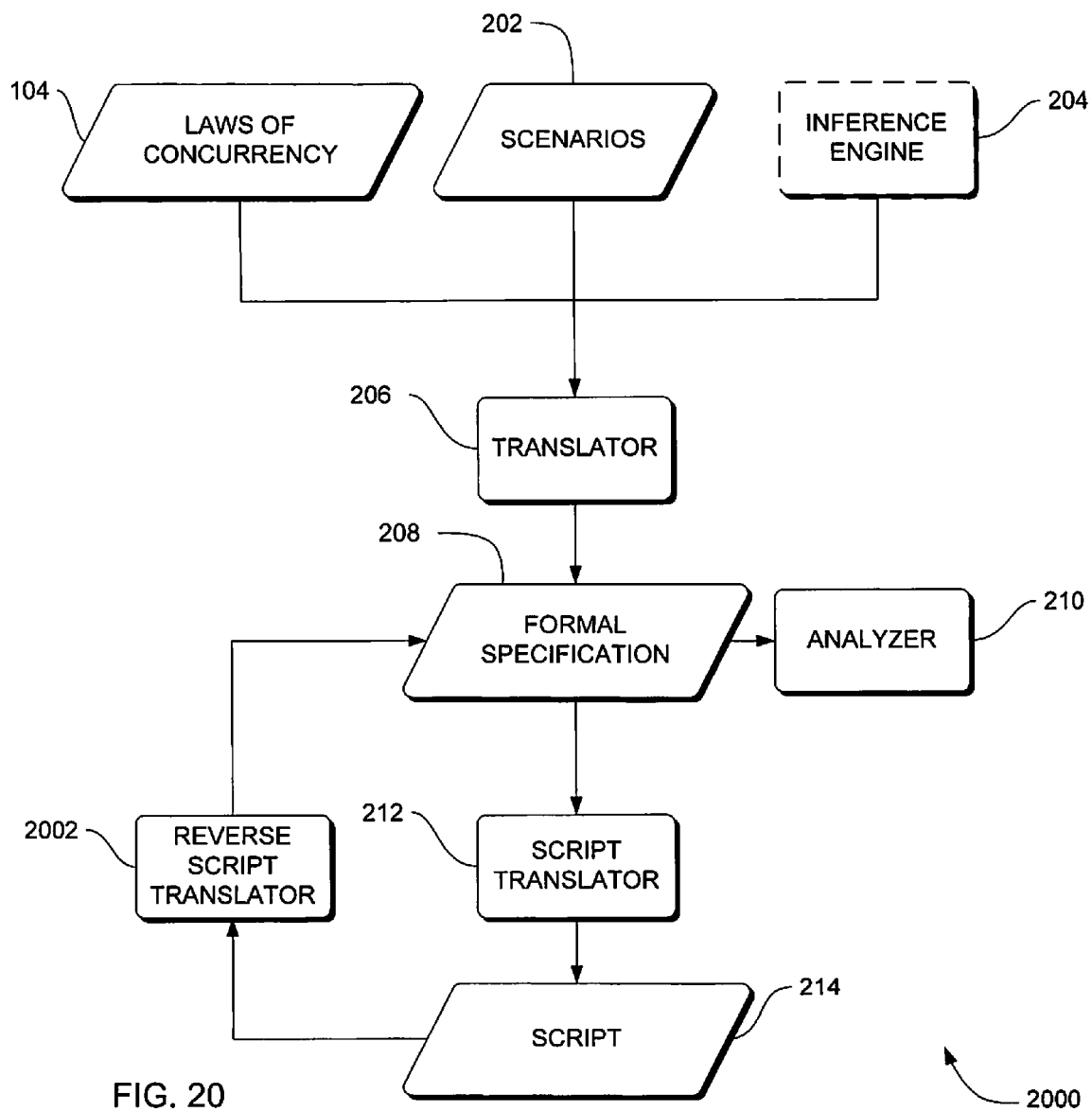
FIG. 20 is a block diagram of a particular implementation of an apparatus capable to translate scenarios to a formal specification, optionally analyze the formal specification and translate the formal specification to a script and reverse engineer (translate) a script into a formal specification and optionally analyze the formal specification, according to an embodiment.
Figure 21:
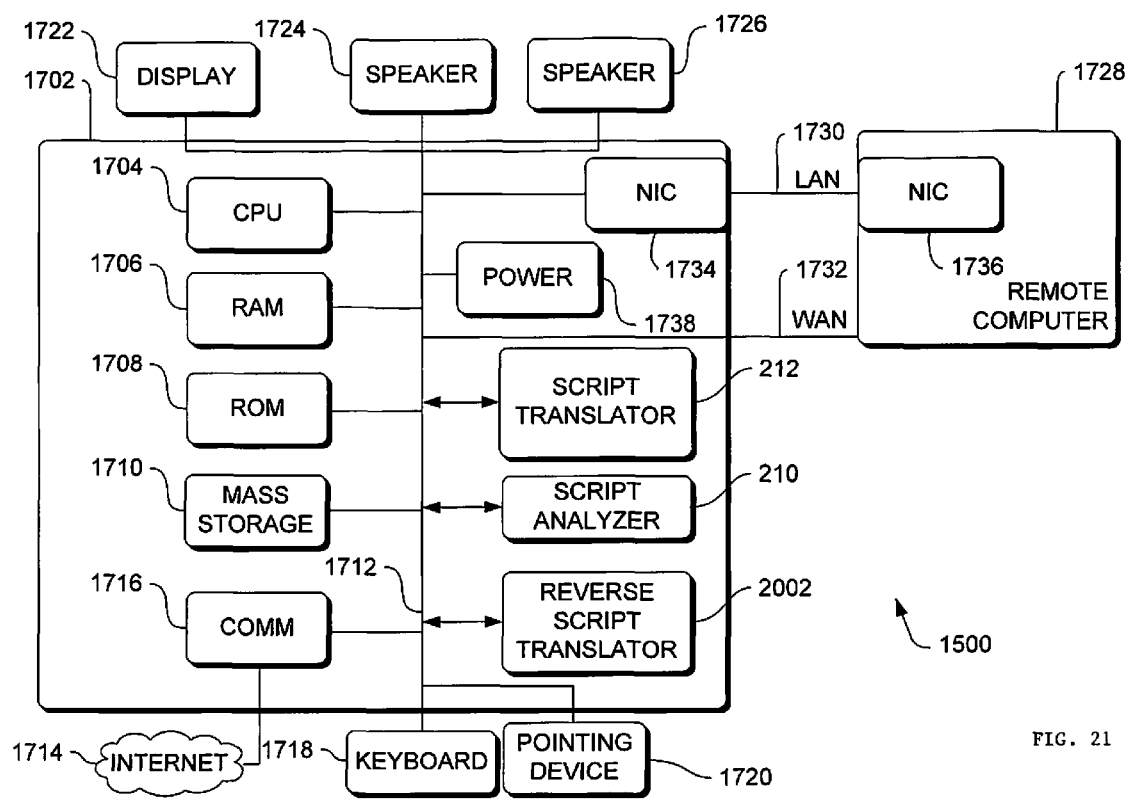
FIG. 21 is a block diagram of a hardware and operating environment in which components of FIG. 20 can be implemented, according to an embodiment.

Referring to FIGS. 20 and 21, a particular scripting language implementation 2000 is described in conjunction with the system overview in FIG. 2 and the methods described in conjunction with FIGS. 5-16.

FIG. 20 is a block diagram of a particular implementation of an apparatus capable of translating scenarios to a formal specification, optionally analyzing the formal specification and translating the formal specification to a script and reverse engineering (translating) a script into a formal specification (and possibly analyzing the formal specification), according to an embodiment. Apparatus 2000 may solve the need in the art for an automated, generally applicable way to verify that implemented scripts are a provably correct implementation of a scenario(s).

Apparatus 2000 can include a translator 206 that generates a formal specification 208 from the laws of concurrency 104 and the scenario(s) 202 in reference to the optional inference engine 204.

Subsequently, the formal specification 208 may be translated by a script translator 212 into a script 214 in some appropriate scripting language. In some embodiments, no manual intervention in the translation may be provided. Those skilled in the art will readily understand that other appropriate notations and/or languages exist that are within the scope of this invention.

In some embodiments, apparatus 2000 can include an analyzer 210 to determine various properties of the formal specification, such as the existence of omissions, deadlock, livelock, and race conditions, as well as other conditions, in the formal specification 208, although one skilled in the art will recognize that other additional properties can be determined by the analyzer 210. The analyzer 210 may solve the need in the prior art to reduce errors.

In some embodiments, a reverse script translator 2002 receives the script 214 and generates a formal specification 208. In various embodiments, the output of the reverse script translator 2002 is a different formal specification than formal specification 208 received from translator 206. While there can be some small differences between the formal specification generated by reverse script translator 2002 and formal specification 208, the formal specifications generated by the reverse script translator 2002 can be substantially functionally equivalent to the formal specification 208.

Apparatus 2000 can operate for a wide variety of languages and applications, and thus apparatus 2000 may be generally applicable. Such applications can include, without limitation, distributed software systems, sensor networks, robot operation, complex scripts for spacecraft integration and testing, and autonomous systems, but those skilled in the art will understand that other applications are contemplated.

Apparatus 2000 components such as the translator 206, script translator 212, the script analyzer 210, and the reverse script translator 2002 can be embodied as computer hardware circuitry or as a computer-readable program, or a combination of both, such as shown in FIG. 21. In another embodiment, apparatus 2000 can be implemented in an application service provider (ASP) system.

FIG. 21 illustrates an environment 2100 similar to that of FIG. 17, but with the addition of the script translator 212, the analyzer 210 and the reverse script translator 2002 that correspond to some of apparatus 2000, according to an embodiment.

In a computer-readable program embodiment, the programs can be structured in an object-orientation using an object-oriented language such as Java, Smalltalk or C++, and the programs can be structured in a procedural-orientation using a procedural language such as COBOL or C. The software components may communicate in any of a number of ways that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components can execute on as few as one computer as in computer 1702 in FIG. 17, or on at least as many computers as there are components.

Figure 22:
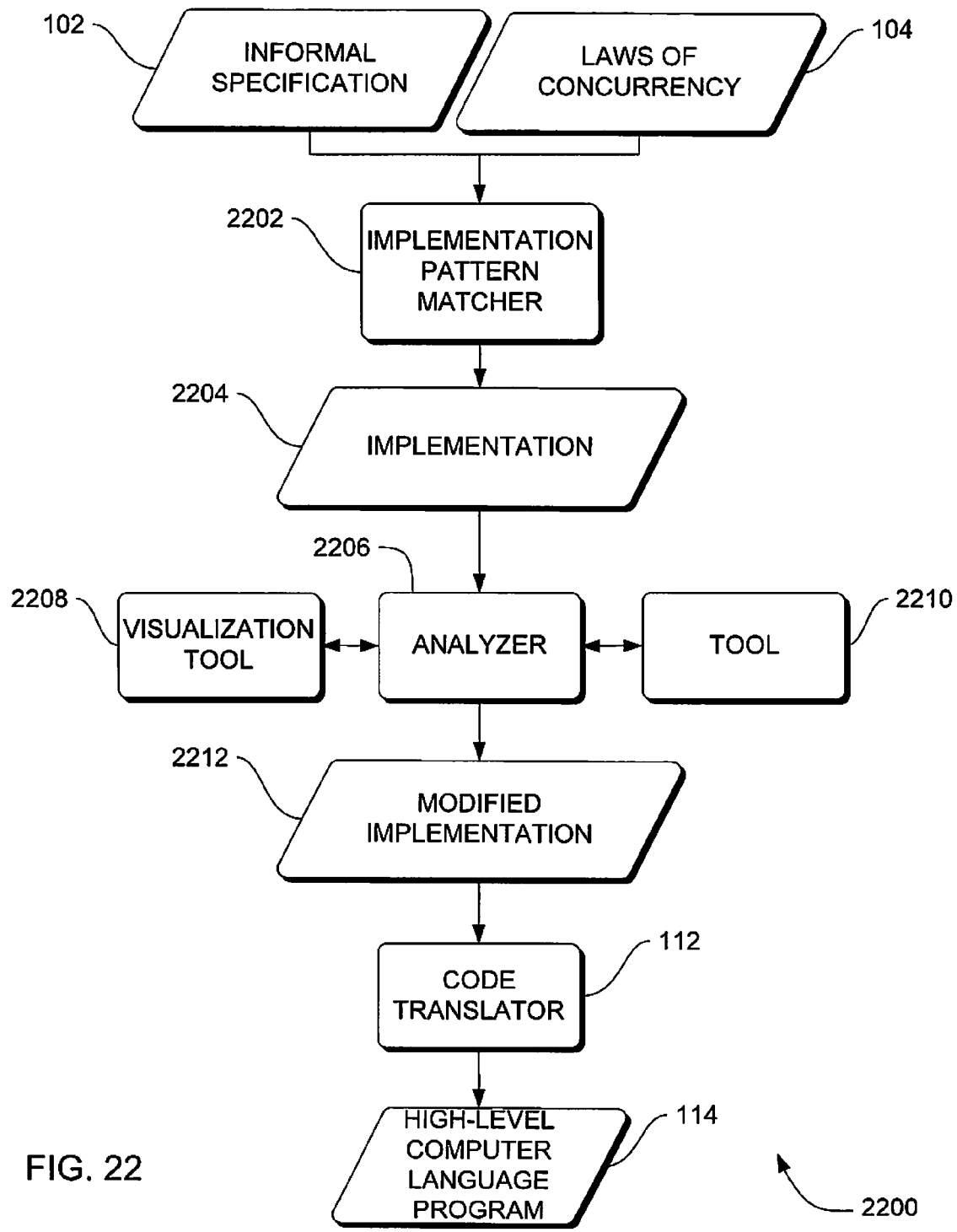
FIG. 22 is a block diagram of a particular CSP pattern-matching implementation of an apparatus to generate a high-level computer source code program from an informal specification, according to an embodiment.

Referring to FIG. 22, a particular apparatus 2200 is described in conjunction with the system overview in FIG. 1 and the methods described in conjunction with FIG. 11 and FIG. 12, according to an embodiment.

FIG. 22 is a block diagram of a particular embodiment of an apparatus 2200 to generate a high-level computer source code program from an informal specification. Apparatus 2200 may solve the need in the art for an automated, generally applicable way to produce a system that is a provably correct implementation of an informal design specification that does not require use of a theorem-prover.

Apparatus 2200 may include an informal specification 102 having a plurality of rules or requirements. The informal specification 102 can be expressed in restricted natural language, graphical notations, or even using semi-formal notations such as unified modeling language (UML) use cases. Apparatus 2200 may also include a set of laws of concurrency 104.

In some embodiments, the informal specification 102 and a set of laws of concurrency 104 are received by a mechanical implementation pattern matcher 2202. The plurality of rules or requirements of the informal specification 102 can be translated mechanically to an implementation 2204. In some embodiments, the mechanical implementation pattern matcher 2202 performs actions 1102 and 1104 in FIG. 11.

In some embodiments, the system includes an implementation analyzer 2206 to perform model verification/checking and determine existence of omissions, deadlock, livelock and race conditions in the implementation 2204. In some embodiments, the implementation analyzer 2206 receives and transmits information from and to a visualization tool 2208 that provides a way to modify the implementation 2204. In some embodiments, the implementation analyzer 2206 receives and transmits information from and to a tool 2210 that provides a way to modify the implementation 2204.

The implementation analyzer 2206 can generate a modified implementation 2212 that is in turn received by a code translator 112 or compiler to translate the modified implementation 2212 to a set of instructions in a high-level computer language program 114, such as Java language.

The implementation analyzer 2206 may allow the user to manipulate the implementation 2204 in various ways. The implementation analyzer 2206 can allow the user to examine the system described by the informal specification 102, and to manipulate it. The implementation 2204 may be analyzed to highlight undesirable behavior, such as race conditions, and equally important, to point out errors of omission in the informal specification 102. The implementation analyzer 2206 can be an optional but useful stage in the disclosed embodiments of the present invention. If the implementation analyzer 2206 is not used, then the implementation 2204 and the modified implementation 2212 are identical. Hence, if the implementation analyzer 2206 is not used then all references to the modified implementation 2212 disclosed below may also apply to the implementation 2204.

In some embodiments, apparatus 2200 does not include a theorem-prover to infer the process-based specification segments from the informal specification.

Apparatus 2200 can be operational for a wide variety of informal specification languages and applications; thus apparatus 2200 can be generally applicable. Such applications may include distributed software systems, sensor networks, robot operation, complex scripts for spacecraft integration and testing, and autonomous systems.

Figure 23:
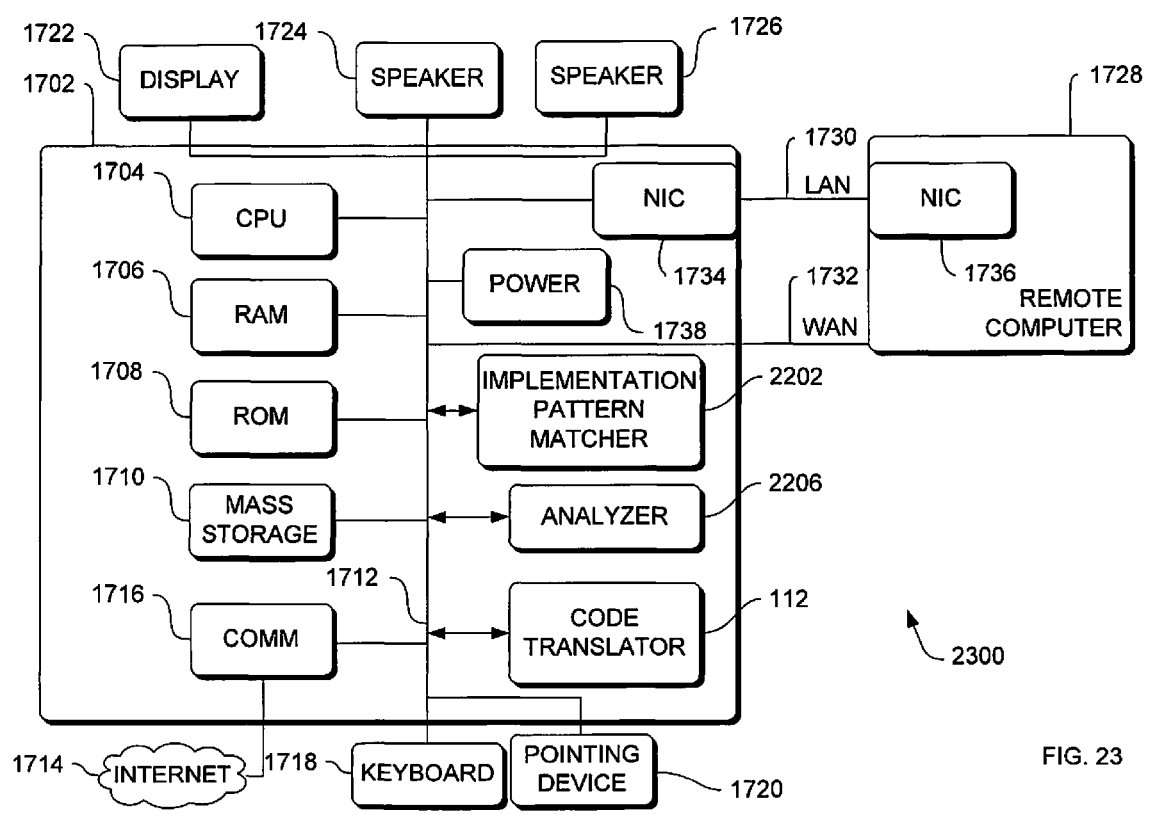
FIG. 23 is a block diagram of a hardware and operating environment in which a particular CSP pattern-matching implementation of FIG. 22 can be implemented, according to an embodiment.

Apparatus 2200 components of the mechanical implementation pattern matcher 2202, the implementation analyzer 2206, visualization tool 2208, tool 2210 and the code translator 112 can be embodied as computer hardware circuitry or as a computer-readable program, or a combination of both, such as shown in FIG. 23. In another embodiment, apparatus 2200 is implemented in an application service provider (ASP) system.

FIG. 23 is a block diagram of a hardware and operating environment in which a particular pattern-matching implementation of FIG. 22 is implemented, according to an embodiment.

Figure 24:
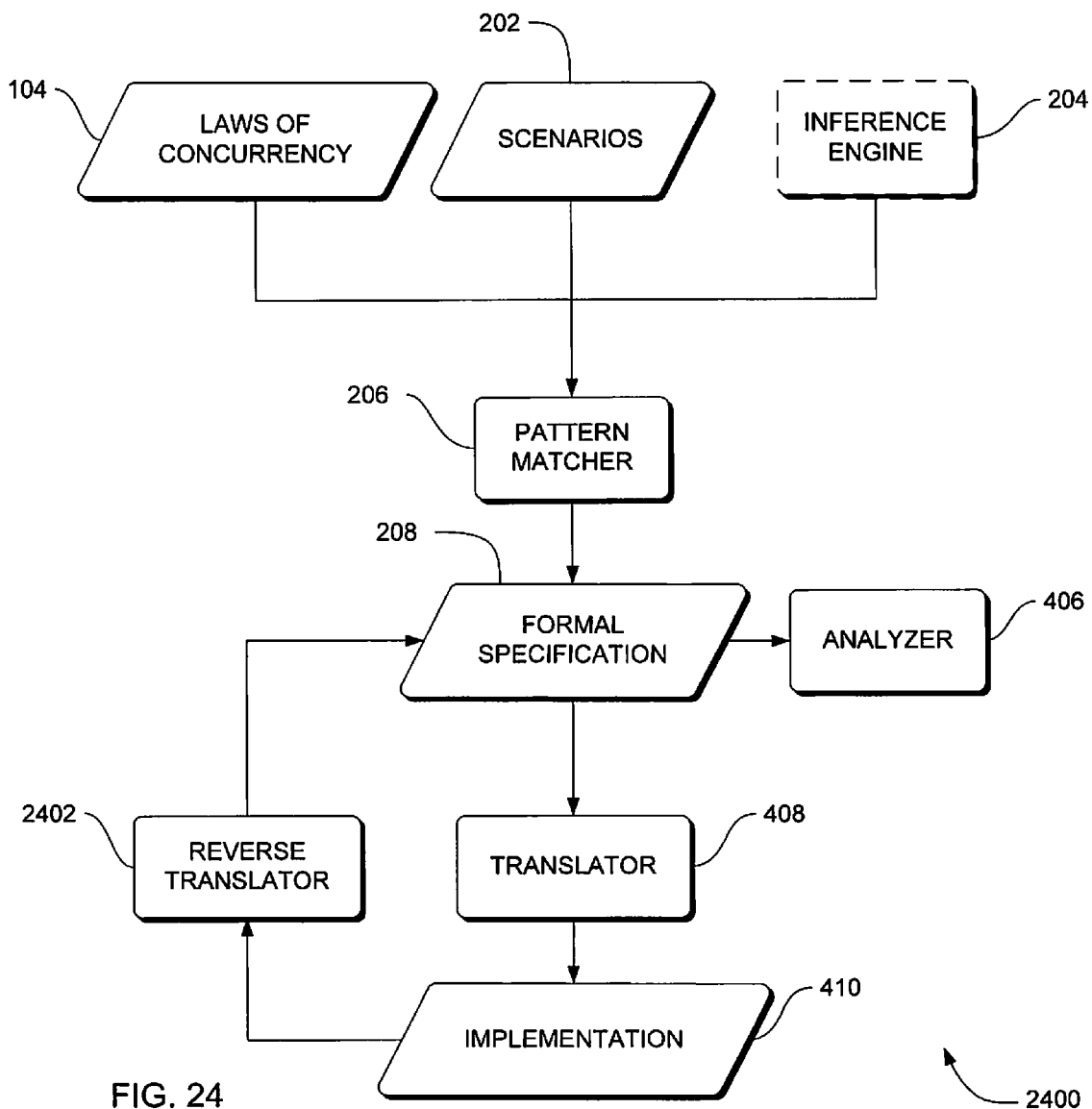
FIG. 24 is a block diagram of a particular implementation of an apparatus capable of pattern-matching scenarios to a formal specification, optionally analyzing the formal specification and translating the formal specification to an implementation and reverse engineering (translating) an implementation into a formal specification and optionally analyzing the formal specification, according to an embodiment.
Figure 25:
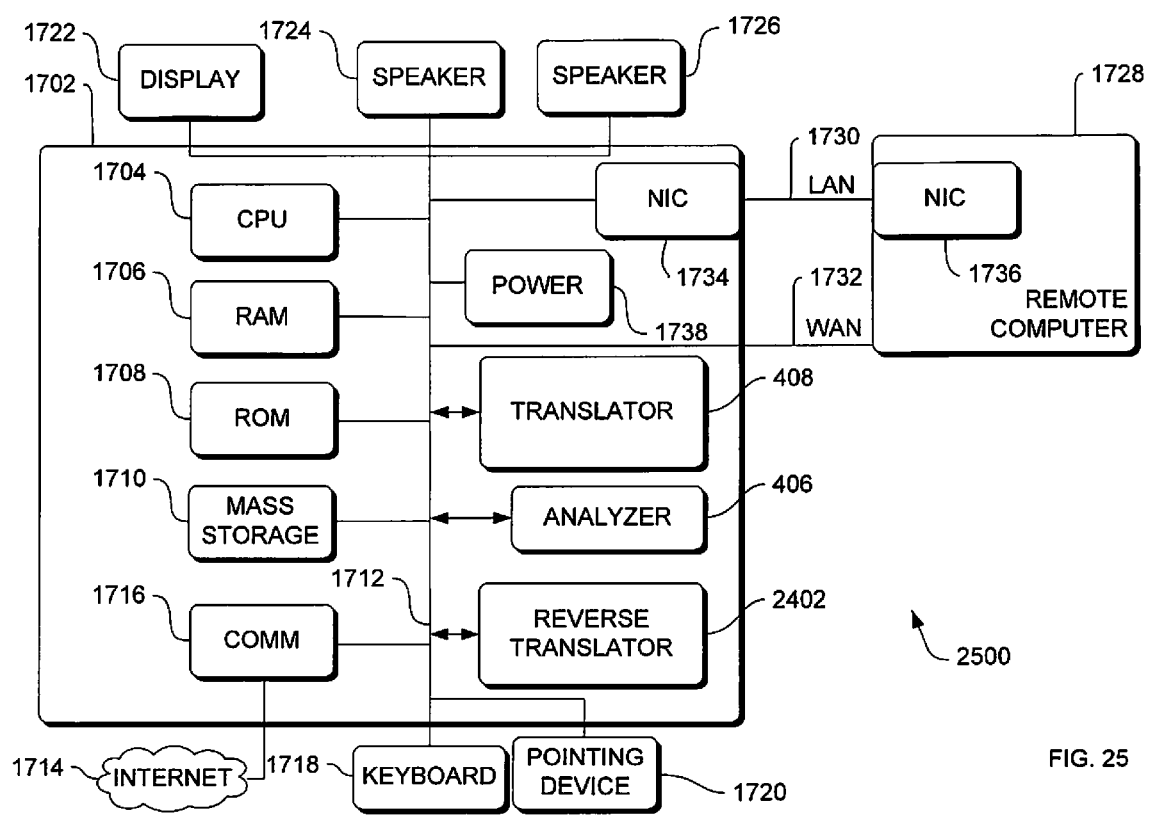
FIG. 25 is a block diagram of a hardware and operating environment in which components of FIG. 24 can be implemented, according to an embodiment.

Referring to FIGS. 24 and 25, a particular pattern-matching embodiment 2400 is described in conjunction with the system overview in FIG. 2 and the methods described in conjunction with FIGS. 5-16.

FIG. 24 is a block diagram of a particular embodiment of an apparatus capable to pattern-match scenarios to a formal specification, optionally analyze the formal specification and translate the formal specification to an implementation and reverse engineer (translate) the implementation into a formal specification (and possibly analyze the formal specification), according to an embodiment. Apparatus 2400 can solve the need in the art for an automated, generally applicable way to verify that implemented scenarios and other implementations are a provably correct implementation of a scenario(s).

Apparatus 2400 can include a pattern matcher 206 that generates a formal specification 208 from the laws of concurrency 104 and the scenario(s) 202 in reference to the optional inference engine 204.

Subsequently, the formal specification 208 may be translated by translator 408 into an implementation 410. In some embodiments no manual intervention in the translation is provided. Those skilled in the art will readily understand that other appropriate notations and/or languages exist that are within the scope of apparatus 2400.

In some embodiments, apparatus 2400 can include an analyzer 406 to determine various properties of the formal specification, such as the existence of omissions, deadlock, livelock, and race conditions, as well as other conditions, in the formal specification 208, although one skilled in the art will recognize that other additional properties can be determined by the analyzer 406. The analyzer 406 may solve the need in the prior art to reduce errors.

In some embodiments, a reverse translator 2402 receives the implementation 410 and generates a formal specification 208. The output of the reverse translator 2402 can be a different formal specification than formal specification 208. There can be some small differences between the formal specification generated by reverse translator 2402 and formal specification 208, but the formal specifications generated by the reverse translator 2402 can be substantially functionally equivalent to the formal specification 208.

Apparatus 2400 can operate for a wide variety of languages and applications, and thus apparatus 2400 can be generally applicable. Such applications can include, without limitation, distributed software systems, sensor networks, robot operation, complex scripts for spacecraft integration and testing, and autonomous systems, but those skilled in the art will understand that other applications are contemplated.

Apparatus 2400 components such as the pattern matcher 206, translator 408, the analyzer 406, and the reverse translator 2402 can be embodied as computer hardware circuitry or as a computer-readable program, or a combination of both, such as shown in FIG. 25. In another embodiment, apparatus 2400 can be implemented in an application service provider (ASP) system.

FIG. 25 illustrates an environment 2500 similar to that of FIG. 17, according to an embodiment, but with the addition of the translator 408, the analyzer 406 and the reverse translator 2402 that correspond to some of apparatus 2400.

CONCLUSION

Systems, methods and apparatus described herein may have many commercial applications, such as (1) Business procedures, in a variety of domains, may be analyzed, evaluated, improved, combined, verified, and automatically implemented in a programming language. (2) Formal modes may have been proposed for analyzing legal contracts. However, legal experts may not be likely to have the required skills to develop such mathematical models. This approach may enable legal contracts to be converted automatically to a formal model and analyzed. (3) Procedures for assembling (or disassembling) components in a factory, in space, or elsewhere, whether performed by robots or humans, are prone to error and "trial and error." The approach disclosed herein may eliminate the uncertainty and may ensure that procedures are correct. (4) There are a large number of implementations in the public domain, in particular in communications networks and the bioinformatics industry. Similarly, NASA (and other organizations) have many existing implementations used for space mission test and integration. Most of these implementations have little or no documentation, meaning that the implementations cannot be used except by explanations of the working of the implementations, and hence their reuse. (5) Existing implementations can be combined using this approach, and can be checked for incompatibilities, etc. Then a single implementation may be generated to combine the functionality of several implementations. This may have major ramifications for bioinformatics, robotic assembly and maintenance, integration and test, and other domains.

Systems and methods for generating implementations from requirements expressed as scenarios are described according to an embodiment. In some embodiments, the systems and methods also allow for "reverse engineering," analysis, and correction of errors found in existing implementations. In some embodiments, the methods allows multiple existing implementations to be combined, discrepancies resolved and re-generated as a single implementation in which confidence can be placed in its correct implementation of the stated requirements (which can be "captured" from the existing implementation).

Although specific embodiments have been illustrated and described herein, it will be appreciated by those of ordinary skill in the art that any arrangement which is calculated to achieve the same purpose can be substituted for the specific embodiments shown. This application is intended to cover any adaptations or variations. For example, although described in procedural terms, one of ordinary skill in the art will appreciate that implementations can be made in an object-oriented design environment or any other design environment that provides the required relationships.

In some embodiments, a formal model may be generated from the scenarios. The formal model may then be analyzed for a range of different possible errors in the scenarios. Additionally, implementations can be generated that correspond to the scenarios. Since the implementations are generated automatically, there may be a significantly reduced likelihood of error, and common "programming" errors may be eliminated. These implementations may be in an implementation language such as PERL, BioPerl, PYTHON, etc. or in a language suitable for controlling machines, robots and other devices.

Existing implementations can be combined, analyzed, and regenerated as a single implementation in the same language, or another language, that increases accuracy and reduces common errors.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all object-oriented, database and communication environments and alternate technologies which provide the same functionality as described herein.

We claim:

1. A non-transitory computer-accessible medium having executable instructions to validate a system, the computer-accessible medium executable instructions capable of directing a processor to perform:
   receiving scenarios of the system;
   pattern-matching the scenarios of the system to at least one process-based specification segment; and
   analyze the formal specification,
   wherein the computer executable instructions comprise pattern-matching the scenarios of the system to a formal specification, in reference to an inference engine, applying mathematical logic to the formal specification in order to identify a presence or absence of mathematical properties of the scenario, and correcting the absence of the mathematical properties if the mathematical properties are identified as absent in the scenario, and
   wherein the mathematical properties of the formal specification comprise whether the formal specification implies a system execution trace that includes a deadlock condition, whether the formal specification implies a system execution trace that includes a livelock condition, and whether the formal specification implies a system execution trace that exhibits or does not exhibit a plurality of other desirable or undesirable behaviors including, but not limited to safety properties, security properties, unreachable states, inconsistencies, naming conflicts, unused variables, unexecuted code.

2. The non-transitory computer-accessible medium of claim 1, wherein the formal specification further comprises a process algebra.

3. The non-transitory computer-accessible medium of claim 2, wherein the process algebra comprises a language of Communicating Sequential Processes.

4. A non-transitory computer-accessible medium having executable instructions to generate a system from scenarios, the executable instructions capable of directing a processor to perform:
   pattern-matching a plurality of scenarios to a formal specification; and translating the formal specification to a process-based specification implementing the system,
   wherein the mathematical properties of the formal specification comprise whether the formal specification implies a system execution trace that includes a deadlock condition, whether the formal specification implies a system execution trace that includes a livelock condition, and whether the formal specification implies a system execution trace that exhibits or does not exhibit a plurality of other desirable or undesirable behaviors including, but not limited to safety properties, security properties, unreachable states, inconsistencies, naming conflicts, unused variables, unexecuted code.

5. The non-transitory computer-accessible medium of claim 4, wherein the executable instructions further comprise:
   verifying the syntax of the plurality of scenarios; and
   mapping the plurality of scenarios to a plurality of formal specification segments.

6. The non-transitory computer-accessible medium of claim 4, wherein the executable instructions further comprise:
   verifying consistency of the formal specification.

7. The non-transitory computer-accessible medium of claim 4, wherein the executable instructions further comprise:
   analyzing the formal specification.

8. The non-transitory computer-accessible medium of claim 4, wherein the executable instructions further comprise:
   determining mathematical and logical properties of the formal specification by an automated inference engine.

9. The non-transitory computer-accessible medium of claim 4, wherein the executable instructions further comprise:
   pattern-matching the plurality of scenarios to a separate formal specification without the use of an automated inference engine.

10. The non-transitory computer-accessible medium of claim 4, wherein the formal specification further comprises a process algebra.

11. The non-transitory computer-accessible medium of claim 10, wherein the process algebra comprises a language of Communicating Sequential Processes.

12. A system to validate a software system, the system comprising:
   a processor;
   an inference engine;
   a pattern-matcher operable to receive a plurality of scenarios of the software system and to generate in reference to the inference engine a specification encoded in a formal specification language; and
   an analyzer, operable to perform model verification/checking and determine existence of omissions, deadlock, livelock, and race conditions or other problems and inconsistencies in the formal specification,
   wherein the mathematical properties of the formal specification comprise whether the formal specification implies a system execution trace that includes a deadlock condition, whether the formal specification implies a system execution trace that includes a livelock condition, and whether the formal specification implies a system execution trace that exhibits or does not exhibit a plurality of other desirable or undesirable behaviors including, but not limited to safety properties, security properties, unreachable states, inconsistencies, naming conflicts, unused variables, unexecuted code.

13. The system of claim 12, wherein the pattern-matching of the scenarios into a specification is carried out without human intervention.

14. A non-transitory computer-accessible medium having executable instructions to validate a system, the executable instructions capable of directing a processor to perform:
receiving scenarios of the system; pattern-matching the scenarios of the system to a formal specification; and
translating the formal specification to an implementation,
wherein the executable instructions further comprise analyzing the formal specification and applying mathematical logic to the formal specification in order to identify a presence or absence of mathematical properties of the formal specification, and
wherein the mathematical properties of the formal specification further comprise whether the formal specification implies a system execution trace that includes a deadlock condition, whether the formal specification implies a system execution trace that includes a livelock condition, and whether the formal specification implies a system execution trace that exhibits or does not exhibit a plurality of other desirable or undesirable behaviors including, but not limited to safety properties, security properties, unreachable states, inconsistencies, naming conflicts, unused variables, unexecuted code.

15. The non-transitory computer-accessible medium of claim 14, wherein the executable instructions further comprise:
pattern-matching the scenarios of the system to the formal specification, without the use of an automated inference engine.

16. The non-transitory computer-accessible medium of claim 14, wherein the executable instructions further comprise:
pattern-matching the scenarios of the system to the formal specification, in reference to an inference engine.

17. The non-transitory computer-accessible medium of claim 14, wherein the formal specification further comprises a process algebra.

18. The non-transitory computer-accessible medium of claim 17, wherein the process algebra comprises a language of Communicating Sequential Processes.

19. The non-transitory computer-accessible medium of claim 14, wherein the executable instructions further comprise pattern-matching the scenario to a formal model; and translating the formal model to at least one scenario.

20. A non-transitory computer-accessible medium having executable instructions to validate a system, the executable instructions capable of directing a processor to perform:
receiving a formal model of the system; and
pattern-matching the formal model to a scenario,
wherein the executable instructions further comprise analyzing the formal model and applying mathematical logic to the formal model in order to identify a presence or absence of mathematical properties of the formal model, and
wherein the mathematical properties of the formal model comprise whether the formal model implies a system execution trace that includes a deadlock condition, whether the formal model implies a system execution trace that includes a livelock condition, and whether the formal model implies a system execution trace that exhibits or does not exhibit a plurality of other desirable or undesirable behaviors safety properties, security properties, unreachable states, inconsistencies, naming conflicts, unused variables, unexecuted code.

21. The non-transitory computer-accessible medium of claim 20, wherein the executable instructions further comprise translating the formal model to at least one scenario.

22. The non-transitory computer-accessible medium of claim 20, wherein the formal model further comprises a process algebra.

23. The non-transitory computer-accessible medium of claim 20, wherein the process algebra comprises a language of Communicating Sequential Processes.

24. A non-transitory computer-accessible medium having executable instructions to validate a system, the executable instructions capable of directing a processor to perform:
receiving a scenario of the system; and
pattern-matching the scenario to a formal model,
wherein the executable instructions further comprise analyzing the formal model and applying mathematical logic to the formal model in order to identify a presence or absence of mathematical properties of the formal model, and
wherein the mathematical properties of the formal model comprise whether the formal model implies a system execution trace that includes a deadlock condition, whether the formal model implies a system execution trace that includes a livelock condition, and whether the formal model implies a system execution trace that exhibits or does not exhibit a plurality of other desirable or undesirable behaviors including, but not limited to safety properties, security properties, unreachable states, inconsistencies, naming conflicts, unused variables, unexecuted code.

25. The non-transitory computer-accessible medium of claim 24, wherein the formal model further comprises a process algebra.

26. The non-transitory computer-accessible medium of claim 25, wherein the process algebra comprises a language of Communicating Sequential Processes.

27. A non-transitory computer-accessible medium having executable instructions to validate a system, the executable instructions capable of directing a processor to perform:
pattern-matching a plurality of scenarios to a plurality of formal models;
combining the plurality of formal models to a singular formal model;
analyzing the singular formal model;
correcting the absence of mathematical properties in the singular formal model; and
translating the formal model to an implementation,
wherein the executable instructions further comprise applying mathematical logic to the singular formal model in order to identify a presence or absence of mathematical properties of the singular formal model, and
wherein the mathematical properties of the singular formal model comprise whether the singular formal model implies a system execution trace that includes a deadlock condition, whether the singular formal model implies a system execution trace that includes a livelock condition, and whether the singular formal model implies a system execution trace that exhibits or does not exhibit a plurality of other desirable or undesirable behaviors including, but not limited to safety properties, security properties, unreachable states, inconsistencies, naming conflicts, unused variables, and unexecuted code.

* * * * *